(12) United States Patent
Yamaguchi et al.

(10) Patent No.: US 9,997,952 B2
(45) Date of Patent: Jun. 12, 2018

(54) WIRELESS CHARGING MODULE AND MOBILE TERMINAL INCLUDING THE SAME

(71) Applicant: Panasonic Intellectual Property Management Co., Ltd., Osaka (JP)

(72) Inventors: Shuichiro Yamaguchi, Osaka (JP); Kenichiro Tabata, Fukuoka (JP); Munenori Fujimura, Fukuoka (JP); Akio Hidaka, Fukuoka (JP); Takumi Naruse, Miyazaki (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 95 days.

(21) Appl. No.: 15/237,047

(22) Filed: Aug. 15, 2016

(65) Prior Publication Data
US 2017/0018953 A1    Jan. 19, 2017

Related U.S. Application Data

(63) Continuation of application No. 14/376,574, filed as application No. PCT/JP2013/000553 on Feb. 1, 2013.

(30) Foreign Application Priority Data

Feb. 17, 2012  (JP) .................................. 2012-032317

(51) Int. Cl.
*H02J 7/02* (2016.01)
*H01F 30/14* (2006.01)
(Continued)

(52) U.S. Cl.
CPC .............. *H02J 7/025* (2013.01); *H01F 38/14* (2013.01); *H01M 2/1066* (2013.01);
(Continued)

(58) Field of Classification Search
CPC . H01F 38/14; H02J 7/025; H02J 50/90; H02J 50/12; H02J 50/40; H01M 2/1066;
(Continued)

(56) References Cited

U.S. PATENT DOCUMENTS 5,198,647 A    3/1993  Mizuta
5,313,444 A    5/1994  Ishii et al.
(Continued)

FOREIGN PATENT DOCUMENTS

CN    101681719 A    3/2010
CN    101771283 A    7/2010
(Continued)

OTHER PUBLICATIONS

International Search Report, dated Dec. 4, 2012, for PCT/JP2012/006644, 4 pages. (With English Translation).
(Continued)

*Primary Examiner* — Stacy Whitmore
(74) *Attorney, Agent, or Firm* — Seed IP Law Group LLP

(57) ABSTRACT

A chargeable communication module is provided, which includes a wireless power charging coil; first and second wireless communication coils, which are respectively electrically isolated from the wireless power charging coil; and a magnetic sheet. The wireless power charging coil is disposed on a surface of the magnetic sheet. The first and second wireless communication coils are adjacent to and outside of the wireless power charging coil. At least a portion of the first wireless communication coil is disposed on the surface of the magnetic sheet. At least a portion of the second wireless communication coil is disposed on the surface of the magnetic sheet.

20 Claims, 16 Drawing Sheets

(51) Int. Cl.
| | |
|---|---|
| *H01M 2/10* | (2006.01) |
| *H01F 38/14* | (2006.01) |
| *H01Q 1/24* | (2006.01) |
| *H01Q 1/38* | (2006.01) |
| *H01Q 1/52* | (2006.01) |
| *H01Q 7/06* | (2006.01) |
| *H01Q 21/28* | (2006.01) |
| *H02J 50/90* | (2016.01) |
| *H02J 50/12* | (2016.01) |
| *H02J 50/40* | (2016.01) |
| *H02J 5/00* | (2016.01) |
| *H02J 7/00* | (2006.01) |

(52) U.S. Cl.
 CPC ............. *H01Q 1/243* (2013.01); *H01Q 1/38* (2013.01); *H01Q 1/521* (2013.01); *H01Q 7/06* (2013.01); *H01Q 21/28* (2013.01); *H02J 50/12* (2016.02); *H02J 50/40* (2016.02); *H02J 50/90* (2016.02); *H02J 5/005* (2013.01); *H02J 7/0044* (2013.01); *H02J 7/0052* (2013.01); *H02J 2007/0096* (2013.01)

(58) Field of Classification Search
 CPC .......... H01Q 1/243; H01Q 1/38; H01Q 1/521; H01Q 7/06; H01Q 21/28
 USPC ................................................. 320/107–108
 See application file for complete search history.

(56) References Cited

U.S. PATENT DOCUMENTS

| | | |
|---|---|---|
| 6,175,212 B1 | 1/2001 | Oguri |
| 6,396,241 B1 | 5/2002 | Ramos et al. |
| 6,625,481 B2 | 9/2003 | Bennett et al. |
| 6,803,744 B1 | 10/2004 | Sabo |
| 7,042,196 B2 | 5/2006 | Ka-Lai et al. |
| 7,271,596 B2 | 9/2007 | Furse et al. |
| 7,948,208 B2 | 5/2011 | Partovi et al. |
| 8,009,007 B2 | 8/2011 | Utsuno et al. |
| 8,055,310 B2 | 11/2011 | Beart et al. |
| 8,089,245 B2 | 1/2012 | Kato et al. |
| 8,188,826 B2 | 5/2012 | Okada et al. |
| 8,193,767 B2 | 6/2012 | Inoue et al. |
| 8,232,764 B2 | 7/2012 | Inoue et al. |
| 8,237,401 B2 | 8/2012 | Sip et al. |
| 8,260,199 B2 | 9/2012 | Kowalski |
| 8,269,375 B2 | 9/2012 | Sogabe et al. |
| 8,280,453 B2 | 10/2012 | Beart et al. |
| 8,283,888 B2 | 10/2012 | Inoue et al. |
| 8,362,868 B2 | 1/2013 | Tamura et al. |
| 8,421,574 B2 | 4/2013 | Suzuki et al. |
| 8,457,550 B2 | 6/2013 | Goto et al. |
| 8,541,977 B2 | 9/2013 | Hasegawa et al. |
| 8,542,018 B2 | 9/2013 | Yoshikawa |
| 8,547,058 B2 | 10/2013 | Tabata et al. |
| 8,552,684 B2 | 10/2013 | Tabata et al. |
| 8,560,024 B2 | 10/2013 | Beart et al. |
| 8,643,219 B2 | 2/2014 | Yabe et al. |
| 8,643,473 B2 | 2/2014 | Suzuki |
| 8,664,801 B2 | 3/2014 | Abe |
| 8,680,811 B2 | 3/2014 | Mochida et al. |
| 8,766,484 B2 | 7/2014 | Baarman et al. |
| 8,811,894 B2 | 8/2014 | Cordier |
| 8,829,731 B2 | 9/2014 | Baarman et al. |
| 8,847,831 B2 | 9/2014 | Kato et al. |
| 8,909,139 B2 | 12/2014 | Aldana et al. |
| 8,922,162 B2 | 12/2014 | Park et al. |
| 8,995,910 B2 | 3/2015 | Chong et al. |
| 9,048,959 B2 | 6/2015 | Voutilainen et al. |
| 9,126,514 B2 | 9/2015 | Soar |
| 9,143,041 B2 | 9/2015 | Itabashi et al. |
| 9,153,855 B2 | 10/2015 | Yamaguchi et al. |
| 9,153,885 B2 | 10/2015 | Yamaguchi et al. |
| 9,240,702 B2 | 1/2016 | Soar |
| 9,265,957 B2 | 2/2016 | Chen et al. |
| 9,362,985 B2 | 6/2016 | Uchida et al. |
| 9,634,515 B2 * | 4/2017 | Hirobe ..................... H01Q 5/40 |
| 2005/0116683 A1 | 6/2005 | Cheng et al. |
| 2005/0151696 A1 | 7/2005 | Govari et al. |
| 2006/0076922 A1 | 4/2006 | Cheng et al. |
| 2006/0082659 A1 | 4/2006 | Koo |
| 2006/0205381 A1 | 9/2006 | Beart et al. |
| 2007/0182367 A1 | 8/2007 | Partovi |
| 2007/0206116 A1 | 9/2007 | Chou |
| 2007/0279022 A1 | 12/2007 | Chen et al. |
| 2007/0297204 A1 | 12/2007 | Lu et al. |
| 2008/0031606 A1 | 2/2008 | Zax et al. |
| 2008/0070003 A1 | 3/2008 | Nakatani et al. |
| 2008/0111518 A1 | 5/2008 | Toya |
| 2008/0122570 A1 | 5/2008 | Takaishi |
| 2008/0164839 A1 | 7/2008 | Kato et al. |
| 2008/0164840 A1 | 7/2008 | Kato et al. |
| 2008/0164844 A1 | 7/2008 | Kato et al. |
| 2008/0297107 A1 | 12/2008 | Kato et al. |
| 2008/0303735 A1 | 12/2008 | Fujimoto et al. |
| 2009/0001932 A1 | 1/2009 | Kamijo et al. |
| 2009/0015362 A1 | 1/2009 | Okada et al. |
| 2009/0021212 A1 | 1/2009 | Hasegawa et al. |
| 2009/0033280 A1 | 2/2009 | Choi et al. |
| 2009/0050624 A1 | 2/2009 | Ventura |
| 2009/0058358 A1 | 3/2009 | Inoue et al. |
| 2009/0096413 A1 | 4/2009 | Partovi et al. |
| 2009/0102419 A1 | 4/2009 | Gwon et al. |
| 2009/0121677 A1 | 5/2009 | Inoue et al. |
| 2009/0212637 A1 | 8/2009 | Baarman et al. |
| 2009/0230777 A1 | 9/2009 | Baarman et al. |
| 2009/0284341 A1 | 11/2009 | Okada et al. |
| 2010/0001823 A1 | 1/2010 | Kawarai |
| 2010/0007215 A1 | 1/2010 | Sakuma |
| 2010/0127813 A1 | 5/2010 | Utsuno et al. |
| 2010/0156344 A1 | 6/2010 | Inoue et al. |
| 2010/0156735 A1 | 6/2010 | Nakamura et al. |
| 2010/0164431 A1 | 7/2010 | Sip et al. |
| 2010/0181842 A1 | 7/2010 | Suzuki et al. |
| 2010/0207575 A1 | 8/2010 | Pijnenburg et al. |
| 2010/0210207 A1 | 8/2010 | Goto et al. |
| 2010/0244579 A1 | 9/2010 | Sogabe et al. |
| 2010/0244839 A1 | 9/2010 | Yoshikawa |
| 2010/0264746 A1 | 10/2010 | Kazama et al. |
| 2010/0270867 A1 | 10/2010 | Abe |
| 2010/0311327 A1 | 12/2010 | Hamada |
| 2010/0320843 A1 | 12/2010 | Kitamura et al. |
| 2011/0025264 A1 | 2/2011 | Mochida et al. |
| 2011/0043050 A1 | 2/2011 | Yabe et al. |
| 2011/0050535 A1 | 3/2011 | Yamaguchi et al. |
| 2011/0102125 A1 | 5/2011 | Tamura et al. |
| 2011/0210619 A1 | 9/2011 | Beart et al. |
| 2011/0210696 A1 | 9/2011 | Inoue |
| 2011/0227799 A1 | 9/2011 | Hashimoto |
| 2011/0241837 A1 | 10/2011 | Suzuki |
| 2011/0267238 A1 | 11/2011 | Nekozuka |
| 2011/0309792 A1 | 12/2011 | Mochida et al. |
| 2011/0316475 A1 | 12/2011 | Jung et al. |
| 2012/0057322 A1 | 3/2012 | Waffenschmidt |
| 2012/0098352 A1 | 4/2012 | Takaishi |
| 2012/0146580 A1 | 6/2012 | Kitamura |
| 2012/0153731 A9 | 6/2012 | Kirby et al. |
| 2012/0181876 A1 | 7/2012 | Baarman et al. |
| 2012/0206307 A1 | 8/2012 | Orihara et al. |
| 2012/0289153 A1 | 11/2012 | Dobyns |
| 2012/0309307 A1 | 12/2012 | D'Amico |
| 2012/0319500 A1 | 12/2012 | Beart et al. |
| 2012/0319647 A1 | 12/2012 | Itabashi et al. |
| 2013/0005251 A1 | 1/2013 | Soar |
| 2013/0033118 A1 | 2/2013 | Karalis et al. |
| 2013/0038278 A1 | 2/2013 | Park et al. |
| 2013/0229252 A1 | 9/2013 | Nogi et al. |
| 2013/0249312 A1 | 9/2013 | Uchida et al. |
| 2013/0249661 A1 | 9/2013 | Motomiya et al. |
| 2013/0267170 A1 | 10/2013 | Chong et al. |
| 2013/0342162 A1 | 12/2013 | Tabata et al. |
| 2014/0232335 A1 | 8/2014 | Tabata et al. |

(56) References Cited

U.S. PATENT DOCUMENTS

| | | |
|---|---|---|
| 2014/0306656 A1 | 10/2014 | Tabata et al. |
| 2014/0349573 A1 | 11/2014 | Moes et al. |
| 2014/0375262 A1 | 12/2014 | Yamaguchi et al. |
| 2015/0091524 A1 | 4/2015 | Park et al. |
| 2015/0116178 A1 | 4/2015 | Kim et al. |
| 2015/0222143 A1 | 8/2015 | Osada et al. |

FOREIGN PATENT DOCUMENTS

| | | | |
|---|---|---|---|
| CN | 101971452 | A | 2/2011 |
| CN | 102017353 | A | 4/2011 |
| CN | 102084440 | A | 6/2011 |
| CN | 102208926 | A | 10/2011 |
| EP | 1 928 003 | A2 | 6/2008 |
| EP | 1 944 851 | A2 | 7/2008 |
| EP | 2 017 860 | A2 | 1/2009 |
| EP | 2 081 199 | A1 | 7/2009 |
| EP | 2 172 952 | A1 | 4/2010 |
| EP | 2 244 351 | A2 | 10/2010 |
| EP | 2 246 864 | A1 | 11/2010 |
| EP | 2 258 032 | A2 | 12/2010 |
| EP | 1 928 003 | B1 | 1/2011 |
| EP | 2 284 849 | A1 | 2/2011 |
| EP | 2 296 228 | A1 | 3/2011 |
| EP | 2 348 517 | A1 | 7/2011 |
| EP | 2 367 262 | A2 | 9/2011 |
| EP | 2 456 044 | A1 | 5/2012 |
| EP | 2 546 844 | A1 | 1/2013 |
| EP | 2 620 961 | A1 | 7/2013 |
| EP | 2 712 053 | A1 | 3/2014 |
| EP | 2 244 351 | B1 | 9/2015 |
| JP | 56-170187 | U | 12/1981 |
| JP | 05-144108 | A | 6/1993 |
| JP | 07-231586 | A | 8/1995 |
| JP | 07-299150 | A | 11/1995 |
| JP | 11-122146 | A | 4/1999 |
| JP | 11-265814 | A | 9/1999 |
| JP | 2002-354713 | A | 12/2002 |
| JP | 2003-045731 | A | 2/2003 |
| JP | 2003-068531 | A | 3/2003 |
| JP | 2003-255288 | A | 9/2003 |
| JP | 2004-047701 | A | 2/2004 |
| JP | 2004-110854 | A | 4/2004 |
| JP | 2005-070855 | A | 3/2005 |
| JP | 2005-224603 | A | 8/2005 |
| JP | 2006-032589 | A | 2/2006 |
| JP | 2006-042519 | A | 2/2006 |
| JP | 2006-126901 | A | 5/2006 |
| JP | 2006-315368 | A | 11/2006 |
| JP | 2007-214754 | A | 8/2007 |
| JP | 2008-027015 | A | 2/2008 |
| JP | 2008-087733 | A | 4/2008 |
| JP | 2008-125115 | A | 5/2008 |
| JP | 2008-135589 | A | 6/2008 |
| JP | 2008-172872 | A | 7/2008 |
| JP | 2008-172874 | A | 7/2008 |
| JP | 2008-205557 | A | 9/2008 |
| JP | 2008-206297 | A | 9/2008 |
| JP | 2008-210861 | A | 9/2008 |
| JP | 2008-235860 | A | 10/2008 |
| JP | 2008-289241 | A | 11/2008 |
| JP | 2008-294385 | A | 12/2008 |
| JP | 2009-005475 | A | 1/2009 |
| JP | 2009-027025 | A | 2/2009 |
| JP | 2009-159660 | A | 7/2009 |
| JP | 2009-182902 | A | 8/2009 |
| JP | 2009-200174 | A | 9/2009 |
| JP | 2009-247125 | A | 10/2009 |
| JP | 2009-253649 | A | 10/2009 |
| JP | 2009-259273 | A | 11/2009 |
| JP | 2009-277820 | A | 11/2009 |
| JP | 2009-284657 | A | 12/2009 |
| JP | 2010-016235 | A | 1/2010 |
| JP | 4400509 | B2 | 1/2010 |
| JP | 2010-041906 | A | 2/2010 |
| JP | 2010-050515 | A | 3/2010 |
| JP | 2010-128219 | A | 6/2010 |
| JP | 2010-129692 | A | 6/2010 |
| JP | 2010-207017 | A | 9/2010 |
| JP | 2010-213570 | A | 9/2010 |
| JP | 2010-219652 | A | 9/2010 |
| JP | 2010-226929 | A | 10/2010 |
| JP | 2010-239781 | A | 10/2010 |
| JP | 2010-239838 | A | 10/2010 |
| JP | 2010-252624 | A | 11/2010 |
| JP | 2010-258913 | A | 11/2010 |
| JP | 2010-259172 | A | 11/2010 |
| JP | 2010-283263 | A | 12/2010 |
| JP | 2010-284059 | A | 12/2010 |
| JP | 2011-024360 | A | 2/2011 |
| JP | 2011-049936 | A | 3/2011 |
| JP | 2011-072074 | A | 4/2011 |
| JP | 2011-072097 | A | 4/2011 |
| JP | 2011-072116 | A | 4/2011 |
| JP | 4669560 | B1 | 4/2011 |
| JP | 2011-101524 | A | 5/2011 |
| JP | 2011-103533 | A | 5/2011 |
| JP | 2011-103694 | A | 5/2011 |
| JP | 2011-514796 | A | 5/2011 |
| JP | 2012-010533 | A | 1/2012 |
| JP | 2012-084893 | A | 4/2012 |
| JP | 2012-119662 | A | 6/2012 |
| JP | 4962634 | B1 | 6/2012 |
| JP | 2012-156279 | A | 8/2012 |
| JP | 2012-157147 | A | 8/2012 |
| JP | 5013019 | B1 | 8/2012 |
| JP | 2013-021902 | A | 1/2013 |
| WO | 2007/080820 | A1 | 7/2007 |
| WO | 2007/122788 | A1 | 11/2007 |
| WO | 2008/156025 | A1 | 12/2008 |
| WO | 2009/053801 | A1 | 4/2009 |
| WO | 2009/105615 | A2 | 8/2009 |
| WO | 2009/114671 | A1 | 9/2009 |
| WO | 2011/007661 | A1 | 1/2011 |
| WO | 2011/016737 | A1 | 2/2011 |
| WO | 2011/096569 | A1 | 8/2011 |
| WO | 2012/073305 | A1 | 6/2012 |
| WO | 2013/084480 | A1 | 6/2013 |

OTHER PUBLICATIONS

Extended European Search Report, dated Jun. 2, 2015, for corresponding EP Application No. 12846180.3-1812 / 2775632, 5 pages.
Korean Office Action, dated Mar. 6, 2015, for corresponding KR Application No. 10-2014-7009494, 12 pages. (With English Translation).
Notification of First Chinese Office Action, dated Mar. 30, 2015, for corresponding CN Application No. 201280053655.4, 13 pages. (With English Translation).
Notification of Reasons for Refusal, dated Apr. 12, 2016, for corresponding JP Application No. 2012-154861, 7 pages. (With English Translation).
Non-Final Office Action, dated Jul. 5, 2017, for corresponding U.S. Appl. No. 15/235,885, 32 pages.
Non-Final Office Action, dated Jun. 12, 2017, for corresponding U.S. Appl. No. 13/876,509, 14 pages.
Notice of Allowance, dated Apr. 19, 2017, for corresponding U.S. Appl. No. 14/410,555, 13 pages.
International Search Report, dated Jun. 18, 2013, for corresponding International Application No. PCT/JP2013/003317, 2 pages.
International Search Report, dated Aug. 20, 2013, for related International Application No. PCT/JP2013/003316, 4 pages.
International Search Report, dated Aug. 20, 2013, for related International Application No. PCT/JP2013/003315, 4 pages.
Notice of Reasons for Refusal, dated Oct. 25, 2016, for corresponding JP Application No. 2012-145962, 6 pages.
Final Office Action dated Nov. 28, 2016, for corresponding U.S. Appl. No. 14/376,574, 27 pages.
Brooke Crothers, Getting a look inside the iPhone 4, Nanotech—The Circuits Blog—CNET News, Jun. 22, 2010, 5 pages.

(56) References Cited

OTHER PUBLICATIONS

English Translation of Chinese Search Report dated May 29, 2015, for corresponding CN Application No. 201280039867.7, 3 pages.
Extended European Search Report, dated Oct. 8, 2014, for corresponding European Application No. 12801388.5-1556/2712053, 8 pages.
International Search Report dated Sep. 4, 2012, for corresponding International Application No. PCT/JP2012/003914, 8 pages.
International Search Report dated Apr. 3, 2012, for corresponding International Application No. PCT/JP2011/007345, 2 pages.
International Search Report dated Dec. 27, 2011, for corresponding International Application No. PCT/JP2011/006025, 4 pages.
Partial English Translation of Japanese Office Action dated May 10, 2011, for corresponding JP Application No. 2011/013619, 6 pages.
Partial English Translation of Japanese Office Action dated Sep. 6, 2011, for corresponding JP Application No. 2011-135946, 6 pages.
Notification of Reasons for Refusal, dated Jun. 27, 2017, corresponding to Japanese Application No. 2016-252053, 6 pages.
International Search Report dated Apr. 2, 2013, for corresponding International Application No. PCT/JP2013/000553, 4 pages. (With English Translation).
English Translation of Notification of Reasons for Refusal, dated Aug. 1, 2017, corresponding to Japanese Application No. 2016-147734, 8 pages.
Non-Final Office Action, dated Oct. 20, 2017, for corresponding U.S. Appl. No. 15/051,408, 22 pages.
Wireless Power Consortium, "System Description Wireless Power Transfer," vol. 1: Low Power, Part 1: Interface Definition, V 1.0.1, Oct. 2010, 86 pages.

\* cited by examiner

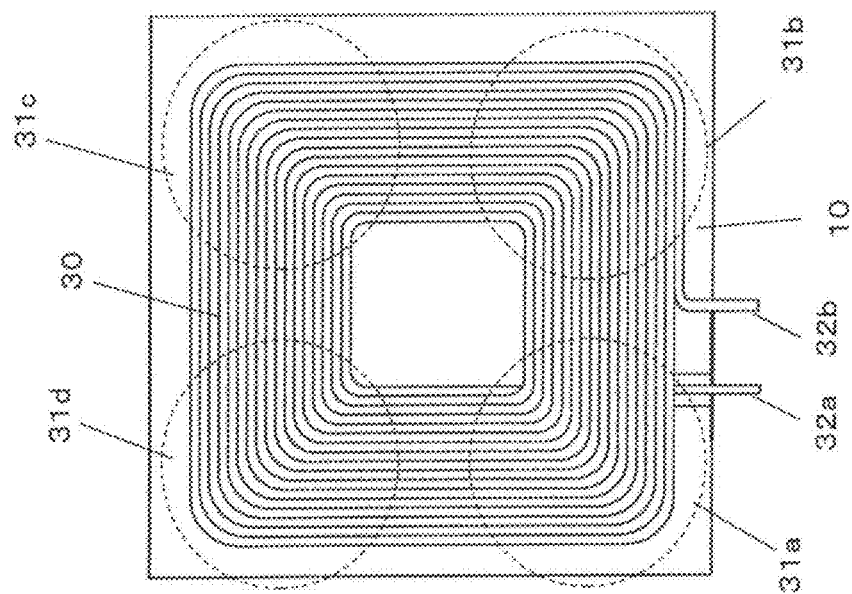
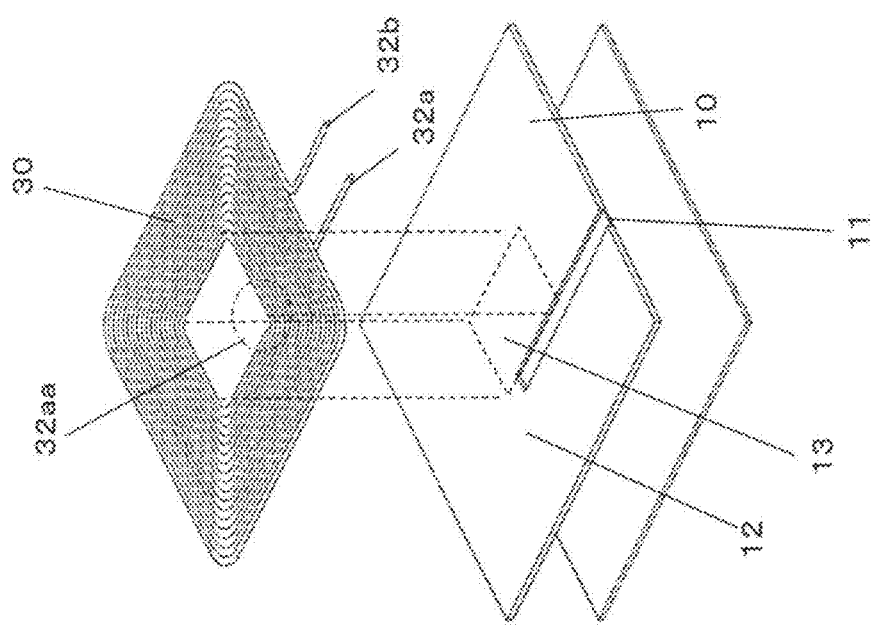
FIG. 2B
FIG. 2A

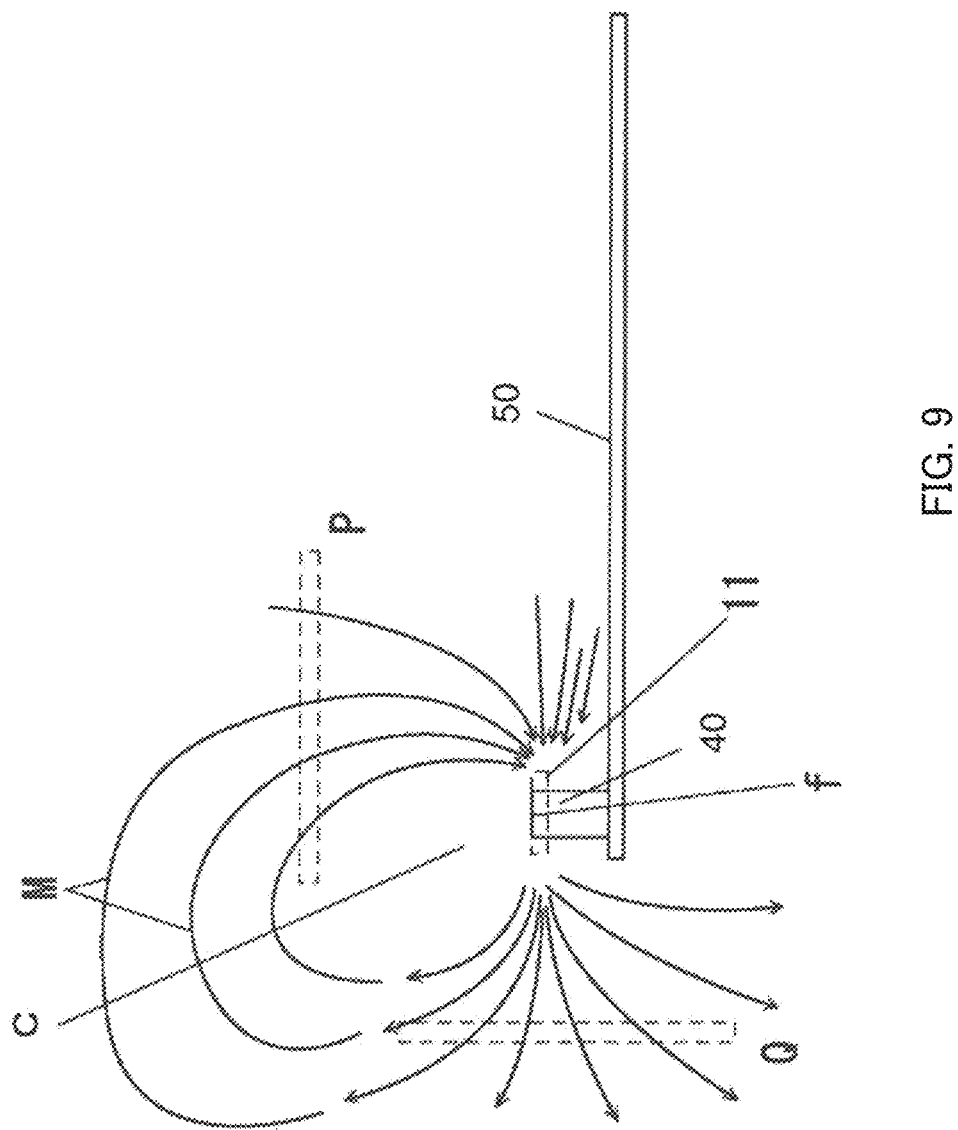

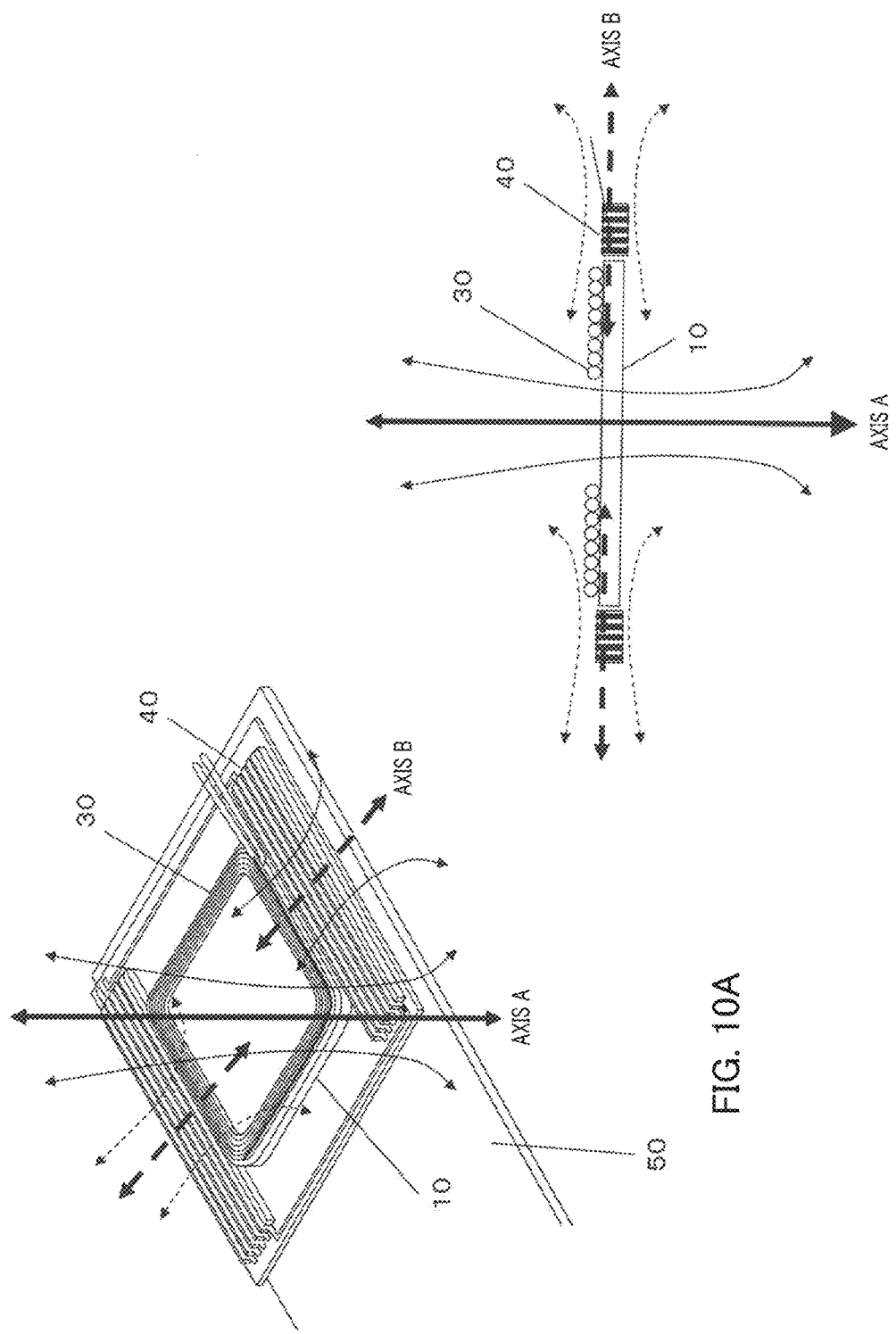

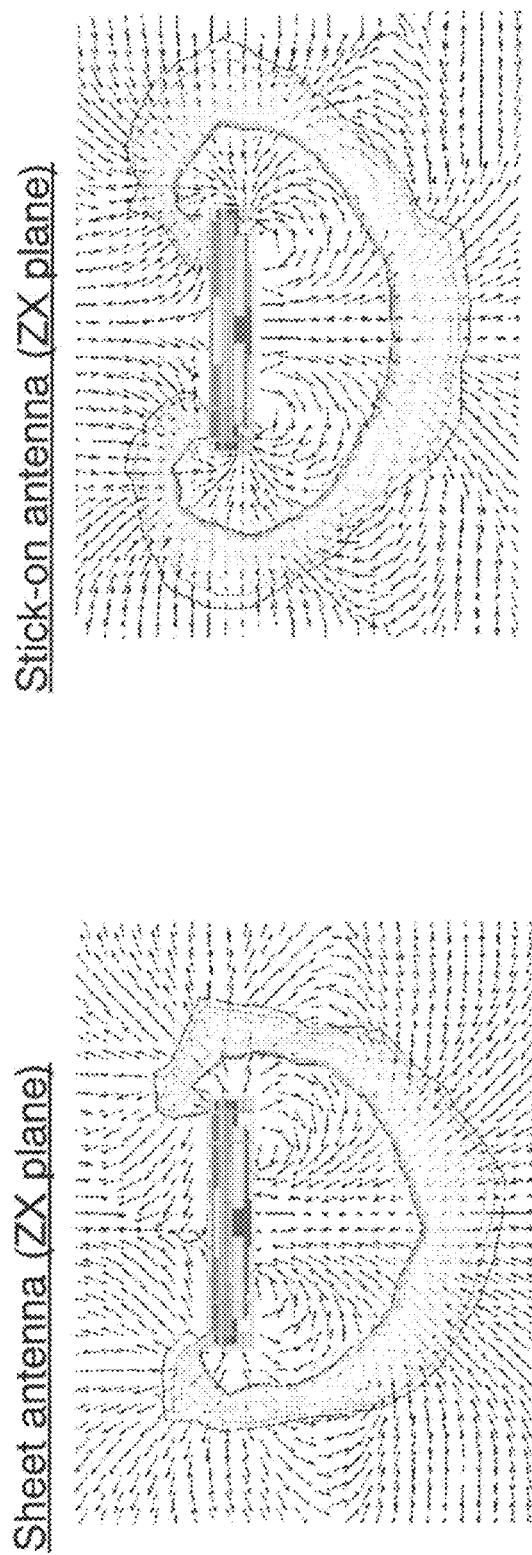

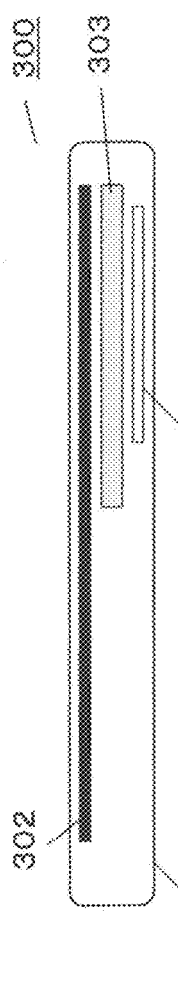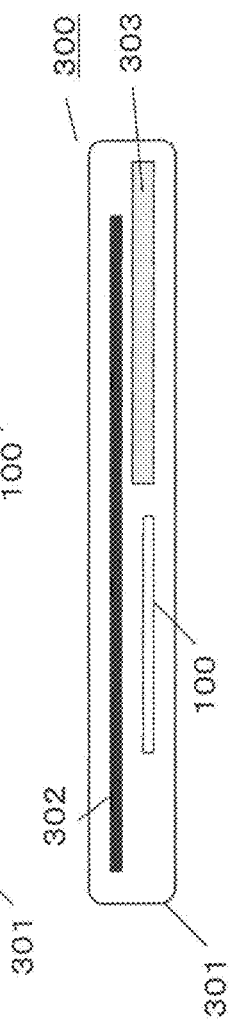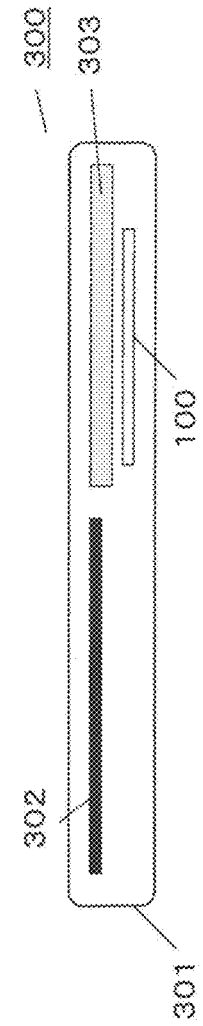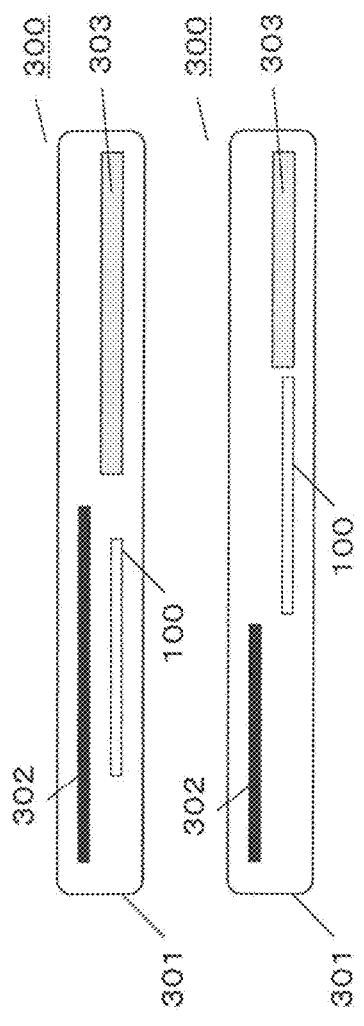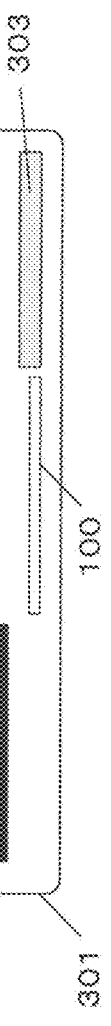
FIG. 15A
FIG. 15B
FIG. 15C
FIG. 15D
FIG. 15E

US 9,997,952 B2

WIRELESS CHARGING MODULE AND MOBILE TERMINAL INCLUDING THE SAME

TECHNICAL FIELD

The present invention relates to a wireless charging module including a wireless charging module and an NFC antenna, as well as a portable terminal that includes the wireless charging module.

BACKGROUND ART

In recent years, NFC (Near Field Communication) antennas that utilize RFID (Radio Frequency IDentification) technology and use radio waves in the 13.56 MHz band and the like are being used as antennas that are mounted in communication apparatuses such as portable terminal devices. To improve the communication efficiency, an NFC antenna is provided with a magnetic sheet that improves the communication efficiency in the 13.56 MHz band and thus configured as an NFC antenna module. Technology has also been proposed in which a wireless charging module is mounted in a communication apparatus, and the communication apparatus is charged by wireless charging. According to this technology, a power transmission coil is disposed on the charger side and a power reception coil is provided on the communication apparatus side, electromagnetic induction is generated between the two coils at a frequency in a band between approximately 100 kHz and 200 kHz to thereby transfer electric power from the charger to the communication apparatus side. To improve the communication efficiency, the wireless charging module is also provided with a magnetic sheet that improves the efficiency of communication in the band between approximately 100 kHz and 200 kHz.

Portable terminals that include such NFC modules and wireless charging modules have also been proposed (for example, see PTL 1).

CITATION LIST

Patent Literature

PTL 1
Japanese Patent No. 4669560

SUMMARY OF INVENTION

A chargeable communication module is provided, which includes a wireless power charging coil; first and second wireless communication coils, which are respectively electrically isolated from the wireless power charging coil; and a magnetic sheet. The wireless power charging coil is disposed on a surface of the magnetic sheet. The first and second wireless communication coils are adjacent to and outside of the wireless power charging coil. At least a portion of the first wireless communication coil is disposed on the surface of the magnetic sheet. At least a portion of the second wireless communication coil is disposed on the surface of the magnetic sheet.

BRIEF DESCRIPTION OF DRAWINGS

FIGS. 2A and 2B are schematic diagrams illustrating a charging coil and a magnetic sheet according to the embodiment of the present invention;

FIG. 9 is a conceptual diagram showing an antenna apparatus formed by an electronic circuit board and an NFC coil that are mounted in a portable terminal according to the present embodiment, and lines of magnetic force generated from the antenna apparatus;

FIGS. 10A and 10B are schematic diagrams of lines of magnetic force that a charging coil and NFC coils generate according to the present embodiment;

FIGS. 14A and 14B each illustrate a magnetic field on a ZX plane of a corresponding one of the two wireless charging modules illustrated in FIGS. 11A and 11B; and FIGS. 15A to 15E are sectional views that schematically illustrate a portable terminal including the wireless charging module according to the present embodiment.

DESCRIPTION OF EMBODIMENT

Figure 1B:
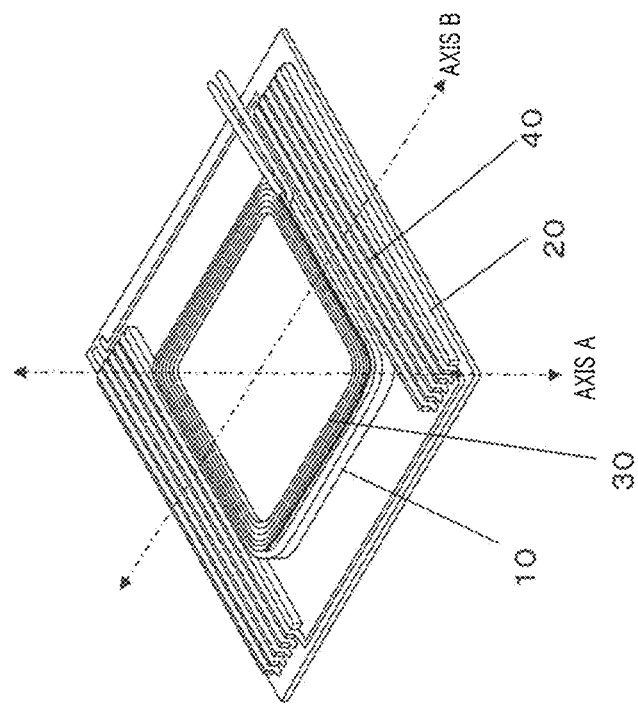
FIGS. 1A-1C are schematic diagrams illustrating a wireless charging module according to an embodiment of the present invention.

The invention of the present disclosure can obtain a wireless charging module that includes a charging coil formed of a wound conducting wire, and an NFC coil that is placed around the charging coil, in which an axis of the charging coil and a winding axis of the NFC coil intersect with each other. The wireless charging module achieves a reduction in size by making a wireless charging coil and an NFC antenna into a single module, and enables communication and power transmission in the same direction while also making coil axis directions of antennas different from each other to prevent mutual interference.

In the wireless charging module of the present disclosure, the axis of the charging coil and the axis of the NFC coil are substantially orthogonal to each other. Thus, mutual interference can be prevented the most.

In the wireless charging module of the present disclosure, the wireless charging module comprises a plurality of the NFC coils, in which the plurality of NFC modules are placed so as to sandwich the wireless charging module between the plurality of NFC modules. Thus, mutual interference can be prevented while a reduction in size is achieved.

Further, in the wireless charging module of the present disclosure: the charging coil is wound in a substantially rectangular shape; and at least two of the NFC coils are placed along two facing sides of the charging coil of the rectangular shape. Thus, a region in which NFC communication is possible can be widened with favorable balance around the wireless charging module.

The wireless charging module of the present disclosure further includes a magnetic sheet including a face on which the charging coil is to be entirely mounted, in which the NFC coil is placed outside the magnetic sheet. Thus, communication of the NFC coil can be performed efficiently.

The wireless charging module of the present disclosure further includes a magnetic sheet including a face on which the charging coil is to be entirely mounted, wherein the NFC coil is wound around a magnetic core. Thus, the thickness and size of the entire wireless charging module can be reduced while a large opening portion of the charging coil that transmits a large amount of power over a short range can be secured.

Further, in the wireless charging module of the present disclosure, the magnetic sheet and the magnetic core are formed of different materials from each other. Thus, objective effects can be improved by using a magnetic material that is suitable for the charging coil that transmits a large amount of power over a short range and a magnetic material that is suitable for the NFC coil that communicates by transmitting a small amount of power over a long range, respectively.

In the wireless charging module of the present disclosure, the magnetic sheet and the magnetic core are formed of different kinds of ferrite from each other. Thus, objective effects can be dramatically improved by using a ferrite material that is suitable for the charging coil that transmits a large amount of power over a short range and a ferrite material that is suitable for the NFC coil that communicates by transmitting a small amount of power over a long range.

In the wireless charging module of the present disclosure, the overall thickness in a stacking direction of the charging coil and the magnetic sheet is greater than a thickness of the NFC coil in a direction identical to the stacking direction. Thus, an overall reduction in size and in thickness can be effectively realized by forming the NFC coil that is placed on the outside with a reduced thickness.

Further, in the wireless charging module of the present disclosure, a length in a longitudinal direction of the two facing sides of the rectangular charging coil is shorter than a length of the NFC coil in a direction identical to the longitudinal direction. Thus, it is difficult for a situation to arise in which the charging coil interferes with a magnetic field that the NFC coil generates.

In the wireless charging module of the present disclosure, a number of turns of the charging coil is greater than a number of turns of the NFC coil. Thus, an inductance value of the charging coil that transmits a larger amount of power can be increased.

In the wireless charging module of the present disclosure, an opening area of the charging coil is larger than an opening area of the NFC coil. Thus, an inductance value of the charging coil that transmits a larger amount of power can be increased.

In the wireless charging module of the present disclosure, the numbers of turns of the plurality of NFC coils are equal to each other. Thus, a magnetic field is generated with favorable balance from the plurality of NFC coils, and hence NFC communication can be stably performed.

Further, in the wireless charging module of the present disclosure, the plurality of NFC coils are an identical shape. Thus, a magnetic field is generated with favorable balance from the plurality of NFC coils, and hence NFC communication can be stably performed.

In addition, a portable terminal of the present disclosure includes the wireless charging module of the present disclosure inside a casing. Thus, it is possible to obtain a wireless charging module that achieves a reduction in size by making a wireless charging coil and an NFC antenna into a single module and enables communication and power transmission in the same direction while also making coil axis directions of antennas different from each other to prevent mutual interference.

In the portable terminal of the present disclosure, a metal body is provided inside the casing and the NFC coil is placed at an edge of the metal body. Thus, a magnetic field that the NFC antenna generates can be caused to incline and NFC communication can be performed more efficiently.

Further, in the portable terminal of the present disclosure, an opening portion of the NFC coil is substantially perpendicular to the metal body. Thus, an eddy current with respect to the NFC antenna that arises inside the metal body can be suppressed, and NFC communication can be performed more efficiently.

Embodiment

[Regarding Wireless Charging Module]

Figure 1A:
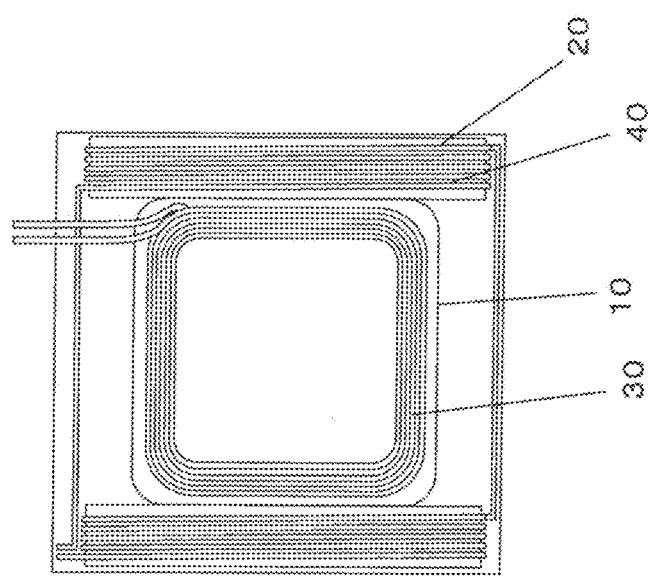
Figure 1C:
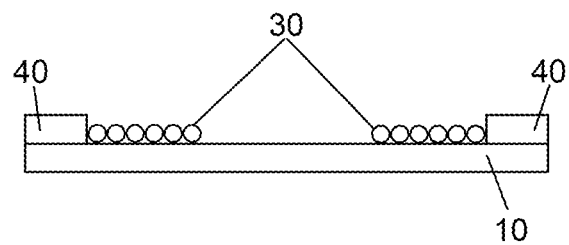

Hereunder, an overview of a wireless charging module according to an embodiment of the present invention will be described using FIGS. 1A-1C. FIGS. 1A-1C are schematic diagrams illustrating a wireless charging module according to an embodiment of the present invention. FIG. 1A is a top view of the wireless charging module, and FIG. 1B is a perspective view of the wireless charging module. FIG. 1C is a schematic side cross-sectional view of the wireless charging module.

Wireless charging module 100 of the present embodiment includes: charging coil 30 that includes a conducting wire wound in a planar shape; two NFC coils 40 that are placed around charging coil 30; and magnetic sheet 10 that supports charging coil 30. The number of NFC coils 40 provided in wireless charging module 100 may also be one, three, four or more.

Wireless charging module 100 includes sheet-like magnetic sheet 10 that includes an upper face and a lower face in an opposite direction. Charging coil 30 is mounted (adhered) on the upper face of magnetic sheet 10. At least one NFC coil 40, and preferably a plurality of NFC coils 40 are placed around magnetic sheet 10 and charging coil 30. In the present embodiment, two NFC coils 40 are provided that face each other with magnetic sheet 10 and charging coil 30 sandwiched therebetween. As shown in FIG. 1C, NFC coils 40 may also be mounted on the upper face of magnetic sheet 10. The coil axes of the two NFC coils 40 are substantially parallel to each other (the coil axes may also intersect at an angle between around −10 to +10 degrees), and the coil axes may be in a relation in which the coil axes are substantially perpendicular or inclined with respect to each other. It is favorable to wind NFC coil 40 around magnetic body 20, since the communication efficiency of NFC coil 40 is improved thereby. The area of an upper face of single magnetic body 20 is smaller than the area of the upper face of magnetic sheet 10. Coil axis A of charging coil 30 and coil axis B of NFC coil 40 intersect with each other in a substantially orthogonal manner (at an angle between approximately 75 and 105 degrees). Although in the present embodiment magnetic sheet 10 and magnetic body 20 come in contact through a protective tape or the like, magnetic sheet 10 and magnetic body 20 may be separated from each other. By making magnetic sheet 10 and magnetic body 20 contact, magnetic sheet 10 and magnetic body 20 can be configured to the maximum size inside wireless charging module 100 that is reduced in size.

[Regarding Charging Coil]

The charging coil will be described in detail using FIGS. 2A and 2B.

FIGS. 2A and 2B are schematic diagrams of a charging coil and a magnetic sheet according to the embodiment of the present invention. FIG. 2A is an exploded view illustrating the arrangement relationship between the charging coil and the magnetic sheet. FIG. 2B is a top view of the charging coil and the magnetic sheet.

In the present embodiment, charging coil 30 is wound in a substantially square shape, but may be wound in any shape such as a substantially rectangular shape including a substantially oblong shape, a circular shape, an elliptical shape, and a polygonal shape.

Charging coil 30 has two leg portions (terminals) 32a and 32b as a starting end and a terminating end thereof, and includes a litz wire constituted by around 8 to 15 conducting wires having a diameter of approximately 0.1 mm or a plurality of wires (preferably, around 2 to 15 conducting wires having a diameter of 0.08 mm to 0.3 mm) that is wound around a hollow portion as though to draw a swirl on the surface. For example, in the case of a coil including a wound litz wire made of 12 conducting wires having a diameter of 0.1 mm, in comparison to a coil including a single wound conducting wire having the same cross-sectional area, the alternating-current resistance decreases considerably due to the skin effect. If the alternating-current resistance decreases while the coil is operating, heat generation by the coil decreases and thus charging coil 30 that has favorable thermal properties can be realized. At this time, if a litz wire that includes 8 to 15 conducting wires having a diameter of 0.08 mm to 1.5 mm is used, favorable power transfer efficiency can be achieved. If a single wire is used, it is advantageous to use a conducting wire having a diameter between 0.2 mm and 1 mm. Further, for example, a configuration may also be adopted, in which, similarly to a litz wire, a single conducting wire is formed of three conducting wires having a diameter of 0.2 mm and two conducting wires having a diameter of 0.3 mm. Leg portions 32a and 32b as a current supply section supply a current from a commercial power source that is an external power source to charging coil 30. Note that an amount of current that flows through charging coil 30 is between approximately 0.4 A and 2 A. In the present embodiment the amount of current is 0.7 A.

In charging coil 30 of the present embodiment, a distance between facing sides (a length of one side) of the hollow portion having a substantially square shape is 20 mm (between 15 mm and 25 mm is preferable), and a distance between facing sides (a length of one side) at an outer edge of the substantially square shape is 30 mm (between 25 mm and 45 mm is preferable). Charging coil 30 is wound in a donut shape. In a case where charging coil 30 is wound in a substantially oblong shape, with respect to facing sides of the hollow portion of the substantially oblong shape, a distance between short sides (a length of one side) is 15 mm (between 10 mm and 20 mm is preferable) and a distance between long sides (a length of one side) is 23 mm (between 15 mm and 30 mm is preferable). Further, with respect to facing sides at an outer edge of a substantially square shape, a distance between short sides (a length of one side) is 28 mm (between 15 mm and 35 mm is preferable) and a distance between long sides (a length of one side) is 36 mm (between 20 mm and 45 mm is preferable). In a case where charging coil 30 is wound in a circular shape, the diameter of the hollow portion is 20 mm (between 10 mm and 25 mm is preferable) and the diameter of an outer edge of the circular shape is 35 mm (between 25 mm and 45 mm is preferable). Note that, the combined thickness of charging coil 30 and magnetic sheet 10 in a state in which charging coil 30 is stacked on magnetic sheet 10 is 0.8 mm. To achieve a reduction in the thickness of the module, it is preferable that the combined thickness of charging coil 30 and magnetic sheet 10 is between 0.6 mm and 1 mm.

In some cases charging coil 30 is the secondary side (power reception side), and utilizes a magnet for alignment with a coil of a primary-side wireless charging module inside a charger that supplies power to charging coil 30 as a counterpart for power transmission. A magnet in such a case is defined by the standard (WPC) as a circular (coin shaped) neodymium magnet having a diameter of approximately 15.5 mm (approximately 10 mm to 20 mm) and a thickness of approximately 1.5 mm to 2 mm or the like. A favorable strength of the magnet is approximately 75 mT to 150 mT. Since an interval between a coil of the primary-side wireless charging module and charging coil 30 is around 2 to 5 mm, it is possible to adequately perform alignment using such a magnet. The magnet is disposed in a hollow portion of the wireless charging module coil on the primary side or secondary side. In the present embodiment, the magnet is disposed in the hollow portion of charging coil 30.

That is, for example, the following methods may be mentioned as an aligning method. For example, a method is available in which a protruding portion is formed in a charging surface of a charger, a recessed portion is formed in an electronic device on the secondary side, and the protruding portion is fitted into the recessed portion to thereby physically (geometrically) perform compulsory aligning. A method is also available in which a magnet is mounted on at least one of the primary side and secondary side, and alignment is performed by attraction between the respective magnets or between a magnet on one side and a magnetic sheet on the other side. According to another method, the primary side detects the position of a coil of the secondary side and automatically moves a coil on the primary side to the position of the coil on the secondary side. Other available methods include a method in which a large number of coils are provided in a charger so that a portable device can be charged at every place on the charging surface of the charger.

Thus, various methods can be mentioned as common methods for aligning the coils of the primary-side (charging-side) wireless charging module and the secondary-side (charged-side) wireless charging module, and the methods are divided into methods that use a magnet and methods that do not use a magnet. By configuring wireless charging module 100 to be adaptable to both a primary-side (charging-side) wireless charging module that uses a magnet and a primary-side wireless charging module that does not use a magnet, charging can be performed regardless of the type of primary-side wireless charging module, which in turn improves the convenience of the module.

The influence that a magnet has on the power transmission efficiency of wireless charging module 100 will be described.

When magnetic flux for electromagnetic induction is generated between the primary-side wireless charging module and wireless charging module 100 to transmit power, the presence of a magnet between or around the primary-side wireless charging module and wireless charging module 100 leads extension of the magnetic flux to avoid the magnet. Otherwise, the magnetic flux that passes through the magnet becomes an eddy current or generates heat in the magnet and is lost. Furthermore, if the magnet is disposed in the vicinity of magnetic sheet 10, magnetic sheet 10 that is in the vicinity of the magnet saturates and the magnetic permeability thereof decreases. Therefore, the magnet that is included in the primary-side wireless charging module may decrease an L value of charging coil 30. As a result, transmission efficiency between the wireless charging modules will decrease. To prevent this, in the present embodiment the hollow portion of charging coil 30 is made larger than the magnet. That is, the area of the hollow portion is made larger than the area of a circular face of the coin-shaped magnet, and an inside edge (portion surrounding the hollow portion) of charging coil 30 is configured to be located at a position that is on the outer side relative to the outer edge of the magnet. Further, because the diameter of the magnet is 15.5 mm or less, it is sufficient to make the hollow portion larger than a circle having a diameter of 15.5 mm. As another method, charging coil 30 may be wound in a substantially oblong shape (including a square shape), and a diagonal of the hollow portion having a substantially oblong shape may be made longer than the diameter (maximum 15.5 mm) of the magnet. As a result, since the corner portions (four corners) at which the magnetic flux concentrates of charging coil 30 that is wound in a substantially oblong shape are positioned on the outer side relative to the magnet, the influence of the magnet can be suppressed. Effects obtained by employing the above described configuration are described hereunder.

Figure 3A:
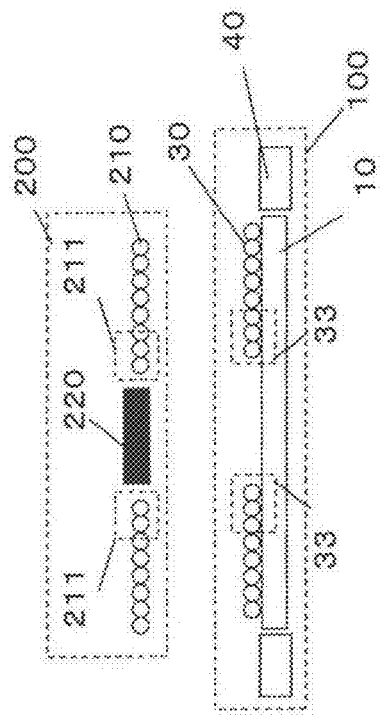
FIG. 3A to 3D illustrate relations between a primary-side wireless charging module that includes a magnet, and a charging coil according to the embodiment of the present invention.
Figure 3B:
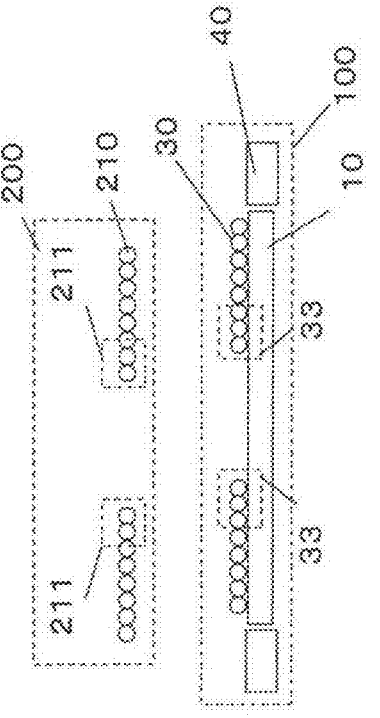
Figure 3C:
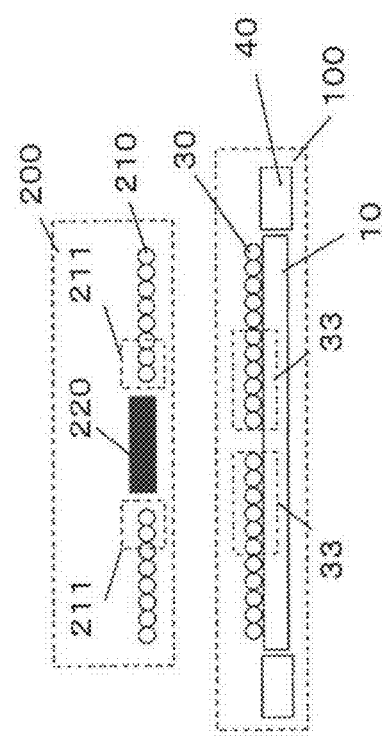
Figure 3D:
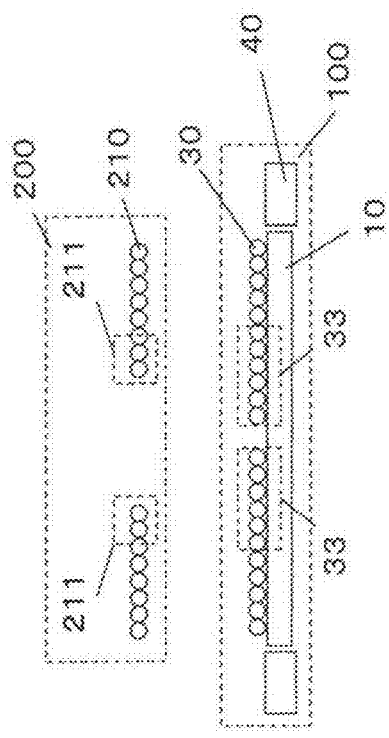

FIGS. 3A to 3D illustrate relations between the primary-side wireless charging module including the magnet, and the charging coil according to the embodiment of the present invention. FIG. 3A illustrates a case where the aligning magnet is used when the inner width of the wound charging coil is small. FIG. 3B illustrates a case where the aligning magnet is used when the inner width of the wound charging coil is large. FIG. 3C illustrates a case where the aligning magnet is not used when the inner width of the wound charging coil is small. FIG. 3D illustrates a case where the aligning magnet is not used when the inner width of the wound charging coil is large.

Primary-side wireless charging module 200 that is disposed inside the charger includes primary-side coil 210, magnet 220, and a magnetic sheet (not illustrated in the drawings). In FIGS. 3A to 3D, magnetic sheet 10, charging coil 30, and NFC coil 40 inside wireless charging module 100 are schematically illustrated.

Wireless charging module 100 and primary-side wireless charging module 200 are aligned so that primary-side coil 210 and charging coil 30 face each other. A magnetic field is generated between inner portion 211 of primary-side coil 210 and inner portion 33 of charging coil 30 and power is transmitted. Inner portion 211 and inner portion 33 face each other. Inner portion 211 and inner portion 33 are close to magnet 220 and are liable to be adversely affected by magnet 220.

In addition, because magnet 220 is disposed in the vicinity of magnetic sheet 10 and magnetic body 20, the magnetic permeability of magnetic sheet 10 in the vicinity of magnet 220 decreases. Naturally, magnetic sheet 10 is closer than magnetic body 20 to magnet 220, and is more liable to be affected by magnet 220. Therefore, magnet 220 included in primary-side wireless charging module 200 weakens the magnetic flux of primary-side coil 210 and charging coil 30, particularly, at inner portion 211 and inner portion 33, and exerts an adverse effect. As a result, the transmission efficiency of the wireless charging decreases. Accordingly, in the case illustrated in FIG. 3A, inner portion 33 that is liable to be adversely affected by magnet 220 is large.

In contrast, in the case illustrated in FIG. 3C in which a magnet is not used, the L value increases because the number of turns of charging coil 30 is large. As a result, since there is a significant decrease in the numerical value from the L value in FIG. 3C to the L value in FIG. 3A, when using a wound coil having a small inner width, the L-value decrease rate with respect to an L value in a case where magnet 220 is included for alignment and an L value in a case where magnet 220 is not included is extremely large.

Further, if the inner width of charging coil 30 is smaller than the diameter of magnet 220 as illustrated in FIG. 3A, charging coil 30 is directly adversely affected by magnet 220 to a degree that corresponds to the area of charging coil 30 that faces magnet 220. Accordingly, it is better for the inner width of charging coil 30 to be larger than the diameter of magnet 220.

In contrast, when the inner width of charging coil 30 is large as illustrated in FIG. 3B, inner portion 33 that is liable to be adversely affected by magnet 220 is extremely small. In the case illustrated in FIG. 3D in which magnet 220 is not used, the L value is smaller than in FIG. 3C because the number of turns of charging coil 30 is less. Thus, because a decrease in the numerical value from the L value in the case illustrated in FIG. 3D to the L value in the case illustrated in FIG. 3B is small, the L-value decrease rate can be suppressed to a small amount in the case of coils that have a large inner width. Further, as the inner width of charging coil 30 increases, the influence of magnet 220 can be suppressed because the distance from magnet 220 to the edge of the hollow portion of charging coil 30 increases.

On the other hand, since wireless charging module 100 is mounted in an electronic device or the like, charging coil 30 cannot be made larger than a certain size. Accordingly, if the inner width of charging coil 30 is enlarged to reduce the adverse effects from magnet 220, the number of turns will decrease and the L value itself will decrease regardless of the presence or absence of magnet 220. Therefore, since magnet 220 can be made the maximum size in a case where the area of magnet 220 and the area of the hollow portion of charging coil 30 are substantially the same (the outer diameter of magnet 220 is about 0 to 2 mm smaller than the inner width of charging coil 30, or the area of magnet 220 is a proportion of about 75% to 95% relative to the area of the hollow portion of charging coil 30), the alignment accuracy between the primary-side wireless charging module and the secondary-side wireless charging module can be improved. Further, if the area of magnet 220 is less than the area of the hollow portion of charging coil 30 (the outer diameter of magnet 220 is about 2 to 8 mm smaller than the inner width of charging coil 30, or the area of magnet 220 is a proportion of about 45% to 75% relative to the area of the hollow portion of charging coil 30), even if there are variations in the alignment accuracy, it is possible to ensure that magnet 220 is not present at a portion at which inner portion 211 and inner portion 33 face each other.

In addition, as charging coil 30 that is mounted in wireless charging module 100 having the same lateral width and vertical width, the influence of magnet 220 can be suppressed more by winding the coil in a substantially rectangular shape rather than in a circular shape. That is, comparing a circular coil in which the diameter of a hollow portion is represented by "x" and a substantially square coil in which a distance between facing sides of the hollow portion (a length of one side) is represented by "x," if conducting wires having the same diameter as each other are wound with the same number of turns, the respective conducting wires will be housed in respective wireless charging modules 100 that have the same width. In such case, length y of a diagonal of the hollow portion of the substantially square-shaped coil will be such that y>x. Accordingly, if the diameter of magnet 220 is taken as "m," a distance (x-m) between the innermost edge of the circular coil and magnet 220 is always constant (x>m). On the other hand, a distance between the innermost edge of a substantially rectangular coil and magnet 220 is a minimum of (x-m), and is a maximum of (y-m) at corner portions 31a to 31d. When charging coil 30 includes corners such as corner portions 31a to 31d, magnetic flux concentrates at the corners during power transmission. That is, corner portions 31a to 31d at which the most magnetic flux concentrates are furthest from magnet 220, and moreover, the width (size) of wireless charging module 100 does not change. Accordingly, the power transmission efficiency of charging coil 30 can be improved without making wireless charging module 100 a large size.

The size of charging coil 30 can be reduced further if charging coil 30 is wound in a substantially oblong shape. That is, even if a short side of a hollow portion that is a substantially oblong shape is smaller than m, as long as a long side thereof is larger than m it is possible to dispose four corner portions outside of the outer circumference of magnet 220. Accordingly, when charging coil 30 is wound in a substantially oblong shape around a hollow portion having a substantially oblong shape, charging coil 30 can be wound in a favorable manner as long as at least the long side of the hollow portion is larger than m. Note that, the foregoing description of a configuration in which the innermost edge of charging coil 30 is on the outer side of magnet 220 that is provided in primary-side wireless charging module 200 and in which four corners of the substantially rectangular hollow portion of charging coil 30 that is wound in a substantially rectangular shape are on the outside of magnet 220 refers to a configuration as shown in FIG. 3B. That is, the foregoing describes a fact that when an edge of the circular face of magnet 220 is extended in the stacking direction and caused to extend as far as wireless charging module 100, a region surrounded by the extension line is contained within the hollow portion of charging coil 30.

Figure 4:
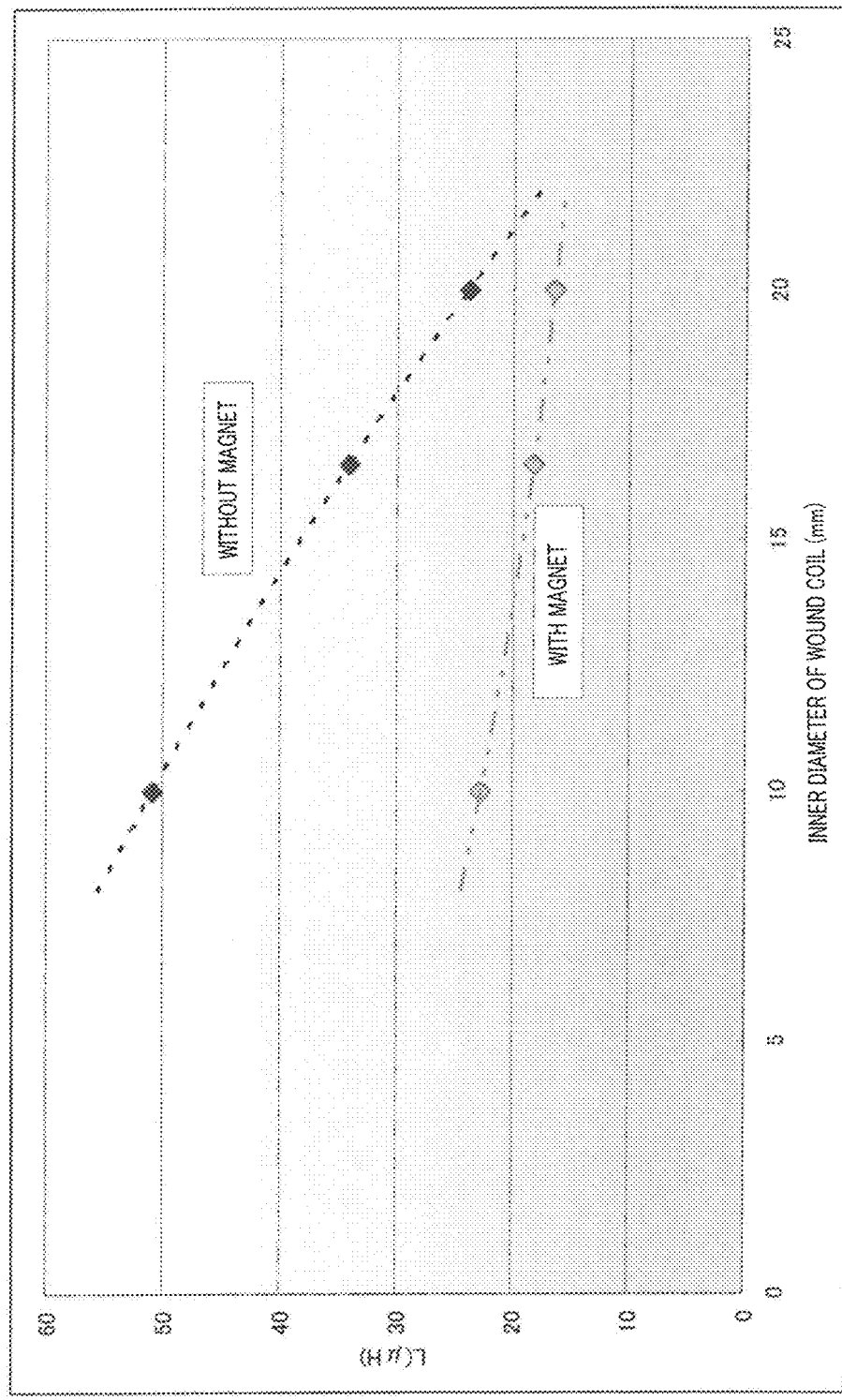
FIG. 4 illustrates a relation between the size of an inner diameter of a hollow portion of a charging coil and an L value of the charging coil when an outer diameter of the hollow portion of the charging coil is kept constant with respect to a case where a magnet is provided in a primary-side wireless charging module and a case where a magnet is not provided therein.

FIG. 4 illustrates a relation between the size of the inner diameter of the wound charging coil and the L value of the charging coil when the outer diameter of the wound charging coil is kept constant, with respect to a case where a magnet is provided in the primary-side wireless charging module and a case where the magnet is not provided therein. As shown in FIG. 4, when the size of magnet 220 and the outer diameter of charging coil 30 are kept constant, the influence of magnet 220 on charging coil 30 decreases as the number of turns of charging coil 30 decreases and the inner diameter of charging coil 30 increases. That is, the L value of charging coil 30 in a case where magnet 220 is utilized for alignment between primary-side wireless charging module 200 and (secondary-side) wireless charging module 100 and the L value of charging coil 30 in a case where magnet 220 is not utilized for alignment approach each other. Accordingly, a resonance frequency when magnet 220 is used and a resonance frequency when magnet 220 is not used become extremely similar values. At such time, the outer diameter of the wound coil is uniformly set to 30 mm. Further, by making the distance between the edge of the hollow portion of charging coil 30 (innermost edge of charging coil 30) and the outer edge of magnet 220 greater than 0 mm and less than 6 mm, the L values in the case of utilizing magnet 220 and the case of not utilizing magnet 220 can be made similar to each other while maintaining the L values at 15 μH or more.

The conducting wire of charging coil 30 may be a single conducting wire that is stacked in a plurality of stages, and the stacking direction in this case is the same as the stacking direction in which magnetic sheet 10 and charging coil 30 are stacked. At such time, by stacking the layers of conducting wire that are arranged in the vertical direction with a space interposed in between, stray capacitance between conducting wire on an upper stage and conducting wire on a lower stage decreases, and the alternating-current resistance of charging coil 30 can be suppressed to a small amount. Further, the thickness of charging coil 30 can be minimized by winding the conducting wire densely. By stacking the conducting wire in this manner, the number of turns of charging coil 30 can be increased to thereby improve the L value. However, in comparison to winding of charging coil 30 in a plurality of stages in the stacking direction, winding of charging coil 30 in one stage can lower the alternating-current resistance of charging coil 30 and raise the transmission efficiency.

If charging coil 30 is wound in a polygonal shape, corner portions (corners) 31a to 31d are provided as described below. Charging coil 30 that is wound in a substantially square shape refers to a coil in which R (radius of a curve at the four corners) of corner portions 31a to 31d that are four corners of the hollow portion is equal to or less than 30% of the edge width of the hollow portion. That is, in FIG. 2B, in the substantially square hollow portion, the four corners have a curved shape. In comparison to right angled corners, the strength of the conducting wire at the four corners can be improved when the corners are curved to some extent. However, if R is too large, there is almost no difference from a circular coil and it will not be possible to obtain effects that are only obtained with a substantially square charging coil 30. It has been found that when the edge width of the hollow portion is, for example, 20 mm, and radius R of a curve at each of the four corners is 6 mm or less, the influence of magnet 220 can be effectively suppressed. Further, when taking into account the strength of the four corners as described above, the greatest effect of the rectangular coil described above can be obtained by making radius R of a curve at each of the four corners an amount that corresponds to a proportion of 5 to 30% relative to the edge width of the substantially square hollow portion. Note that, even in the case of charging coil 30 wound in a substantially oblong shape, the effect of the substantially oblong coil described above can be obtained by making radius R of a curve at each of the four corners an amount that corresponds to a proportion of 5 to 30% relative to the edge width (either one of a short side and a long side) of the substantially oblong hollow portion. Note that, in the present embodiment, with respect to the four corners at the innermost end (hollow portion) of charging coil 30, R is 2 mm, and a preferable value for R is between 0.5 mm and 4 mm.

Further, when winding charging coil 30 in a rectangular shape, preferably, leg portions 32*a* and 32*b* are provided in the vicinity of corner portions 31*a* to 31*d*. When charging coil 30 is wound in a circular shape, irrespective of where leg portions 32*a* and 32*b* are provided, leg portions 32*a* and 32*b* can be provided at a portion at which a planar coil portion is wound in a curve. When the conducting wire is wound in a curved shape, a force acts that tries to maintain the curved shape thereof, and it is difficult for the overall shape to be broken even if leg portions 32*a* and 32*b* are formed. In contrast, in the case of a coil in which the conducting wire is wound in a rectangular shape, there is a difference in the force with which the coil tries to maintain the shape of the coil itself with respect to side portions (linear portions) and corner portions. That is, at corner portions 31*a* to 31*d* in FIG. 2B, a large force acts to try to maintain the shape of charging coil 30. However, at each side portion, a force that acts to try to maintain the shape of charging coil 30 is small, and the conducting wire is liable to become uncoiled from charging coil 30 in a manner in which the conducting wire pivots around the curves at corner portions 31*a* to 31*d*. As a result, the number of turns of charging coil 30 fluctuates by, for example, about ⅛ turn, and the L value of charging coil 30 fluctuates. That is, the L value of charging coil 30 varies. Accordingly, it is favorable for a winding start point on leg portion 32*a* side of the conducting wire to be adjacent to corner portion 31*a*, and for the conducting wire to bend at corner portion 31*a* immediately after the winding start point. The winding start point and corner portion 31*a* may also be adjacent. Subsequently, the conducting wire is wound a plurality of times until a winding end point is formed before bending at corner portion 31*a*, and the conducting wire then forms leg portion 32*b* and is bent to the outer side of charging coil 30. At this time, the conducting wire is bent to a larger degree in a gradual manner at the winding end point compared to the winding start point. This is done to enhance a force that tries to maintain the shape of leg portion 32*b*.

If the conducting wire is a litz wire, a force that tries to maintain the shape of charging coil 30 is further enhanced. In the case of a litz wire, since the surface area per wire is large, if an adhesive or the like is used to fix the shape of charging coil 30, it is easy to fix the shape thereof. In contrast, if the conducting wire is a single wire, because the surface area per conducting wire decreases, the surface area to be adhered decreases and the shape of charging coil 30 is liable to become uncoiled.

According to the present embodiment charging coil 30 is formed using a conducting wire having a circular sectional shape, but a conducting wire having a square sectional shape may be used as well. In the case of using a conducting wire having a circular sectional shape, since gaps arise between adjacent conducting wires, stray capacitance between the conducting wires decreases and the alternating-current resistance of charging coil 30 can be suppressed to a small amount.

[Regarding Magnetic Sheet]

Magnetic sheet 10 includes flat portion 12 on which charging coil 30 is mounted, center portion 13 that is substantially the center portion of flat portion 12 and that corresponds to (faces) the inside of the hollow region of charging coil 30, and slit 11 into which at least a part of two leg portions 32*a* and 32*b* of charging coil 30 is inserted. Slit 11 need not be formed as shown in FIGS. 1A and 1B, and is also not limited to a slit shape that penetrates through magnetic sheet 10, and may be formed in the shape of a non-penetrating recessed portion as shown in FIGS. 2A and 2B. Forming slit 11 in a slit shape facilitates manufacture and makes it possible to securely house the conducting wire. On the other hand, forming slit 11 in the shape of a recessed portion makes it possible to increase the volume of magnetic sheet 10, and it is thereby possible to improve the L value of charging coil 30 and the transmission efficiency. Center portion 13 may be formed in a shape that, with respect to flat portion 12, is any one of a protruding portion shape, a flat shape, a recessed portion shape, and the shape of a through-hole. If center portion 13 is formed as a protruding portion, the magnetic flux of charging coil 30 can be strengthened. If center portion 13 is flat, manufacturing is facilitated and charging coil 30 can be easily mounted thereon, and furthermore, a balance can be achieved between the influence of aligning magnet 220 and the L value of charging coil 30 that is described later. A detailed description with respect to a recessed portion shape and a through-hole is described later.

A Ni—Zn ferrite sheet (sintered body), a Mn—Zn ferrite sheet (sintered body), or a Mg—Zn ferrite sheet (sintered body) or the like can be used as magnetic sheet 10. Magnetic sheet 10 may be configured as a single layer, may be configured by stacking a plurality of sheets made of the same material in the thickness direction, or may be configured by stacking a plurality of different magnetic sheets 10 in the thickness direction. It is preferable that, at least, the magnetic permeability of magnetic sheet 10 is 250 or more and the saturation magnetic flux density thereof is 350 mT or more.

An amorphous metal can also be used as magnetic sheet 10. The use of ferrite sheet as magnetic sheet 10 is advantageous in that the alternating-current resistance of charging coil 30 can be reduced, while the use of amorphous metal as magnetic sheet 10 is advantageous in that the thickness of charging coil 30 can be reduced.

Magnetic sheet 10 is substantially square with a size of approximately 40×40 mm (from 35 mm to 50 mm). In a case where magnetic sheet 10 is a substantially oblong shape, a short side thereof is 35 mm (from 25 mm to 45 mm) and a long side is 45 mm (from 35 mm to 55 mm). The thickness thereof is 0.43 mm (in practice, between 0.4 mm and 0.55 mm, and a thickness between approximately 0.3 mm and 0.7 mm is adequate). It is desirable to form magnetic sheet 10 in a size that is equal to or greater than the size of the outer circumferential edge of magnetic body 20. Magnetic sheet 10 may be a circular shape, a rectangular shape, a polygonal shape, or a rectangular and polygonal shape having large curves at four corners.

Slit 11 houses the conducting wire of leg portion 32*a* that extend from winding start point 32*aa* (innermost portion of coil) charging coil 30 to the lower end portion of magnetic sheet 10. Thus, slit 11 prevents the conducting wire from winding start point 32*aa* of charging coil 30 to leg portion 32*a* overlapping in the stacking direction at a planar winding portion of charging coil 30.

Slit 11 is formed so that one end thereof is substantially perpendicular to an end (edge) of magnetic sheet 10 that intersects therewith, and so as to contact center portion 13 of magnetic sheet 10. In a case where charging coil 30 is circular, by forming slit 11 so as to overlap with a tangent of center portion 13 (circular), leg portions 32*a* and 32*b* can be formed without bending winding start point 32*aa* of the conducting wire. In a case where charging coil 30 is a substantially rectangular shape, by forming slit 11 so as to overlap with an extension line of a side of center portion 13 (having a substantially rectangular shape), leg portions 32a and 32b can be formed without bending the winding start portion of the conducting wire. The length of slit 11 depends on the inner diameter of charging coil 30 and the size of magnetic sheet 10. In the present embodiment, the length of slit 11 is between approximately 15 mm and 30 mm.

Slit 11 may also be formed at a portion at which an end (edge) of magnetic sheet 10 and center portion 13 are closest to each other. That is, when charging coil 30 is circular, slit 11 is formed to be perpendicular to the end (edge) of magnetic sheet 10 and a tangent of center portion 13 (circular), and is formed as a short slit. Further, when charging coil 30 is substantially rectangular, slit 11 is formed to be perpendicular to an end (edge) of magnetic sheet 10 and a side of center portion 13 (substantially rectangular), and is formed as a short slit. It is thereby possible to minimize the area in which slit 11 is formed and to improve the transmission efficiency of a wireless power transmission device. Note that, in this case, the length of slit 11 is approximately 5 mm to 20 mm. In both of these configurations, the inner side end of slit 11 (slit) is connected to center portion 13.

Next, adverse effects on the magnetic sheet produced by the magnet for alignment described in the foregoing are described. As described above, when the magnet is provided in primary-side wireless charging module 200 for alignment, due to the influence of magnet 220, the magnetic permeability of magnetic sheet 10 decreases at a portion that is close to magnet 220 in particular. Accordingly, the L value of charging coil 30 varies significantly between a case where magnet 220 for alignment is provided in primary-side wireless charging module 200 and a case where magnet 220 is not provided. It is therefore necessary to provide magnetic sheet 10 such that the L value of charging coil 30 changes as little as possible between a case where magnet 220 is close thereto and a case where magnet 220 is not close thereto.

When the electronic device in which wireless charging module 100 is mounted is a mobile phone, in many cases wireless charging module 100 is disposed between the case constituting the exterior package of the mobile phone and a battery pack located inside the mobile phone, or between the case and a substrate located inside the case. In general, since the battery pack is a casing made of aluminum, the battery pack adversely affects power transmission. This is because an eddy current is generated in the aluminum in a direction that weakens the magnetic flux generated by the coil, and therefore the magnetic flux of the coil is weakened. For this reason, it is necessary to alleviate the influence with respect to the aluminum by providing magnetic sheet 10 between the aluminum which is the exterior package of the battery pack and charging coil 30 disposed on the exterior package thereof. Further, there is a possibility that an electronic component mounted on the substrate will interfere with power transmission of charging coil 30, and the electronic component and charging coil 30 will exert adverse effects on each other. Consequently, it is necessary to provide magnetic sheet 10 or a metal film between the substrate and charging coil 30, and suppress the mutual influences of the substrate and charging coil 30.

In consideration of the above described points, it is important that magnetic sheet 10 that is used in wireless charging module 100 have a high level of magnetic permeability and a high saturation magnetic flux density so that the L value of charging coil 30 is made as large as possible. It is sufficient if the magnetic permeability of magnetic sheet 10 is 250 or more and the saturation magnetic flux density thereof is 350 mT or more. In the present embodiment, magnetic sheet 10 is a Mn—Zn ferrite sintered body having a magnetic permeability between 1,500 and 2,500, a saturation magnetic flux density between 400 and 500, and a thickness between approximately 400 μm and 700 μm. However, magnetic sheet 10 may be made of Ni—Zn ferrite, and favorable power transmission can be performed with primary-side wireless charging module 200 as long as the magnetic permeability thereof is 250 or more and the saturation magnetic flux density is 350 or more.

Charging coil 30 forms an LC resonance circuit through the use of a resonant capacitor. At such time, if the L value of charging coil 30 varies significantly between a case where magnet 220 provided in primary-side wireless charging module 200 is utilized for alignment and a case where magnet 220 is not utilized, a resonance frequency with the resonant capacitor will also vary significantly. Since the resonance frequency is used for power transmission (charging) between primary-side wireless charging module 200 and wireless charging module 100, if the resonance frequency varies significantly depending on the presence/absence of magnet 220, it will not be possible to perform power transmission correctly. However, by adopting the above described configuration, variations in the resonance frequency that are caused by the presence/absence of magnet 220 are suppressed, and highly efficient power transmission is performed in all situations.

A further reduction in thickness is enabled in a case where magnetic sheet 10 is a ferrite sheet composed of Mn—Zn ferrite. That is, the frequency of electromagnetic induction is defined by the standard (WPC) as a frequency between approximately 100 kHz and 200 kHz (for example, 120 kHz). A Mn—Zn ferrite sheet provides a high level of efficiency in this low frequency band. Note that a Ni—Zn ferrite sheet provides a high level of efficiency at a high frequency. Accordingly, in the present embodiment, magnetic sheet 10 that is used for wireless charging for performing power transmission at a frequency between approximately 100 kHz and 200 kHz is constituted by a Mn—Zn ferrite sheet, and magnetic body 20 that is used for NFC communication in which communication is performed at a frequency of approximately 13.56 MHz is constituted by a Ni—Zn ferrite sheet. By using respectively different kinds of ferrite to form magnetic sheet 10 and magnetic body 20 in this manner, magnetic sheet 10 and magnetic body 20 can efficiently perform power transmission and communication, respectively. Further, even when magnetic sheet 10 and magnetic body 20 are reduced in thickness and reduced in size, sufficient efficiency can be obtained by magnetic sheet 10 and magnetic body 20, respectively.

A hole may be formed at the center of center portion 13 of magnetic sheet 10. Note that, the term "hole" may refer to either of a through-hole and a recessed portion. The hole may be larger or smaller than center portion 13, and it is favorable to form a hole that is smaller than center portion 13. That is, when charging coil 30 is mounted on magnetic sheet 10, the hole may be larger or smaller than the hollow portion of charging coil 30. If the hole is smaller than the hollow portion of charging coil 30, all of charging coil 30 will be mounted on magnetic sheet 10.

As described in the foregoing, by configuring wireless charging module 100 to be adaptable to both a primary-side (charging-side) wireless charging module that uses a magnet and primary-side wireless charging module 200 that does not use a magnet, charging can be performed regardless of the type of primary-side wireless charging module 200, which improves the convenience of the module. There is a demand to make the L value of charging coil 30 in a case where magnet 220 is provided in primary-side wireless charging module 200 and the L value of charging coil 30 in a case where magnet 220 is not provided therein close to each other, and to also improve both L values. In addition, when magnet 220 is disposed in the vicinity of magnetic sheet 10, the magnetic permeability of center portion 13 of magnetic sheet 10 that is in the vicinity of magnet 220 decreases. Therefore, a decrease in the magnetic permeability can be suppressed by providing the hole in center portion 13.

Figure 5:
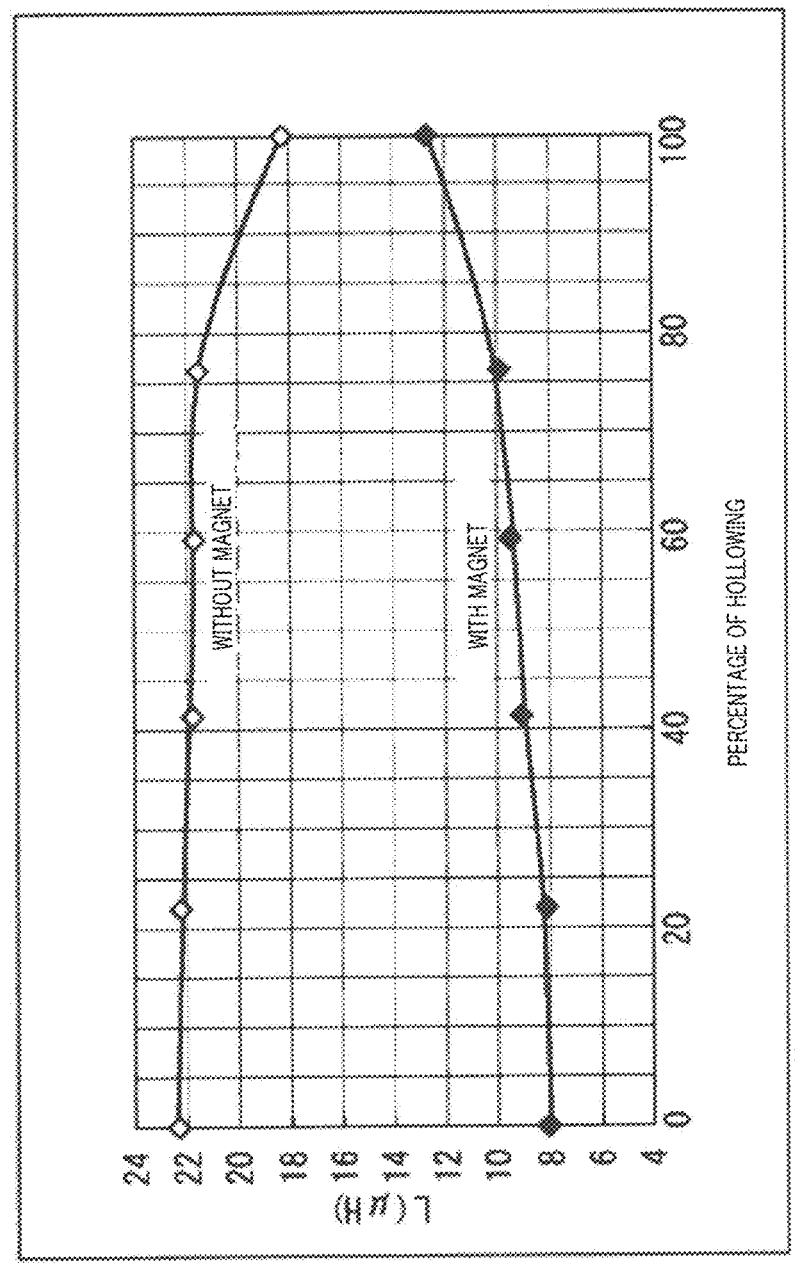
FIG. 5 illustrates a relation between an L value of a charging coil and a percentage of hollowing of a center portion with respect to a case where a magnet is provided in a primary-side wireless charging module and a case where a magnet is not provided therein.

FIG. 5 illustrates a relation between an L value of a charging coil in a case where a magnet is provided in the primary-side wireless charging module and a case where a magnet is not provided, and the percentage of hollowing of the center portion. Note that a percentage of hollowing of 100% means that the hole in center portion 13 is a through-hole, and a percentage of hollowing of 0% means that a hole is not provided. Further, a percentage of hollowing of 50% means that, for example, a hole (recessed portion) of a depth of 0.3 mm is provided with respect to a magnetic sheet having a thickness of 0.6 mm.

As shown in FIG. 5, in the case where magnet 220 is not provided in primary-side wireless charging module 200, the L value decreases as the percentage of hollowing increases. At such time, although the L value decreases very little when the percentage of hollowing is from 0% to 75%, the L value decreases significantly when the percentage of hollowing is between 75% and 100%. In contrast, when magnet 220 is provided in primary-side wireless charging module 200, the L value rises as the percentage of hollowing increases. This is because the charging coil is less liable to be adversely affected by the magnet. At such time, the L value gradually rises when the percentage of hollowing is between 0% and 75%, and rises significantly when the percentage of hollowing is between 75% and 100%.

Accordingly, when the percentage of hollowing is between 0% and 75%, while maintaining the L value in a case where magnet 220 is not provided in primary-side wireless charging module 200, the L value in a case where magnet 220 is provided in primary-side wireless charging module 200 can be increased. Further, when the percentage of hollowing is between 75% and 100%, the L value in a case where magnet 220 is not provided in primary-side wireless charging module 200 and the L value in a case where magnet 220 is provided in primary-side wireless charging module 200 can be brought significantly close to each other. The greatest effect is achieved when the percentage of hollowing is between 40 and 60%. Magnet 220 and the magnetic sheet can adequately attract each other when magnet 220 is provided and the L value of a case where magnet 220 is provided in primary-side wireless charging module 200 is increased to 1 pH or more while the L value of a case where no magnet 220 is provided in primary-side wireless charging module 200 is maintained.

[Regarding NFC Coil and Magnetic Body]

The NFC coil will now be described in detail using FIG. 6 to FIGS. 8A and 8B.

Figure 6:
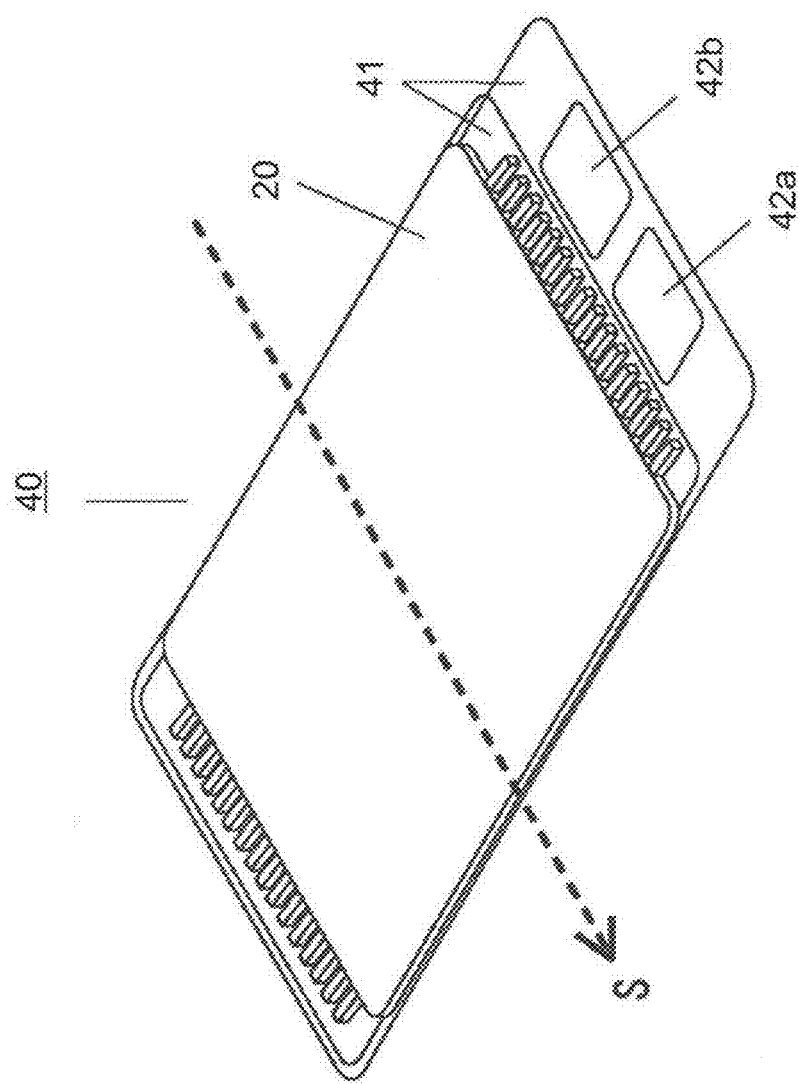
FIG. 6 is a perspective view when the NFC coil and the magnetic body according to the present embodiment have been assembled.
Figure 7:
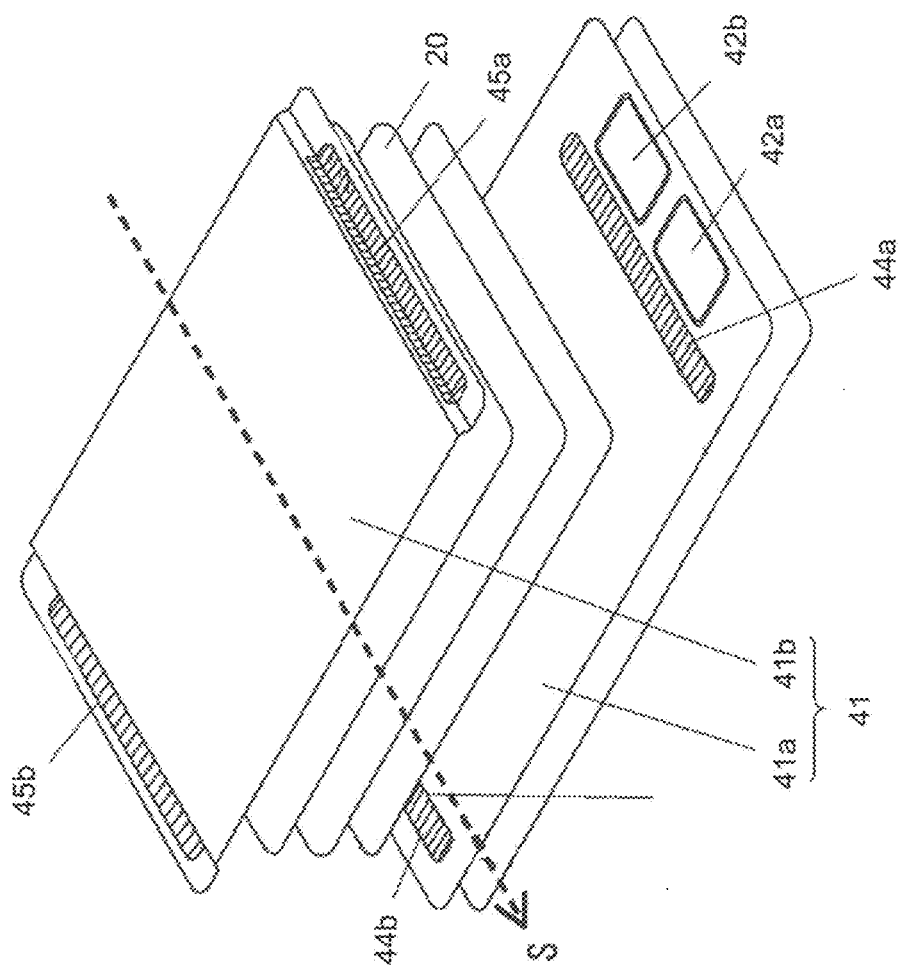
FIG. 7 is an exploded view illustrating the arrangement of the NFC coil and the magnetic body according to the present embodiment.

FIG. 6 is a perspective view when the NFC coil and the magnetic body according to the present embodiment have been assembled. FIG. 7 is an exploded view illustrating the arrangement of the NFC coil and the magnetic body according to the present embodiment.

NFC coil 40 according to the present embodiment that is illustrated in FIG. 6 is an antenna that carries out short-range wireless communication which performs communication by electromagnetic induction using the 13.56 MHz frequency, and a sheet antenna is generally used therefor.

As shown in FIG. 6, NFC coil 40 of the present embodiment includes flexible substrate 41 as a conductor arrangement section that is placed so as to envelop the circumference of magnetic body 20 formed of ferrite or the like and which is a coil pattern formed on a support medium mainly constituted by resin. NFC coil 40 is a component that generates lines of magnetic force for NFC communication for performing communication with radio communication media such as an unillustrated IC card or IC tag. While the specific shape of the coil pattern is not illustrated in FIG. 6 and FIG. 7, a coil pattern is formed in which straight line with an arrow S is taken as the coil axis. Normally, the coil pattern and an adjustment pattern that is described later are formed, for example, by copper foil that is formed between two resin layers, namely, a polyimide film and a cover lay or resist, of flexible substrate 41.

In practice, as shown in FIG. 7, flexible substrate 41 has a shape that is divided into two parts that sandwich magnetic body 20. In the present embodiment, for convenience, among the parts of flexible substrate 41 that is divided in two, a side that has external connection terminals 42a and 42b is taken as lower-side flexible substrate (first arrangement section) 41a, and the side without external connection terminals 42a and 42b is taken as upper-side flexible substrate (second arrangement section) 41b. Lower-side flexible substrate 41a and upper-side flexible substrate 41b are joined by soldering. In the present embodiment, lower-side flexible substrate 41a and upper-side flexible substrate 41b are joined at two sides of flexible substrate 41 that are substantially parallel with coil axis S. The terms "lower-side" and "upper-side" are assigned to facilitate understanding in FIG. 7, and the upper and lower sides may be reversed at a time of mounting in a device as NFC coil 40.

In the present embodiment, the width of upper-side flexible substrate 41b in the direction of coil axis S is set so that magnetic body 20 does not protrude. The width is set in this manner so that, particularly in a case in which magnetic body 20 is constituted by ferrite that is easily broken, broken pieces or residue of magnetic body 20 are prevented from scattering inside a communication apparatus in which NFC coil 40 is mounted (for example, portable terminal 1 in FIGS. 1A and 1B) and adversely affecting the communication apparatus.

The size of magnetic body 20 is 5 mm×36 mm×0.21 mm. A suitable width in the longitudinal direction is between 25 mm and 50 mm. As illustrated in FIGS. 1A and 1B, it is preferable to form magnetic body 20 with a larger width than the width of magnetic sheet 10 in the same direction. Since portions (both ends) that are less susceptible to the influence of (not liable to couple with) charging coil 30 when performing NFC communication can thereby be created, the efficiency of NFC communication can be improved. Further, a width between 3 and 10 mm in the short-side direction is sufficient. The width depends on the number of turns of NFC coil 40. The thickness of magnetic body 20 is preferably thinner than the thickness when magnetic sheet 10 and charging coil 30 are stacked, and a thickness between around 0.15 to 1 mm is preferable.

Figure 8A:
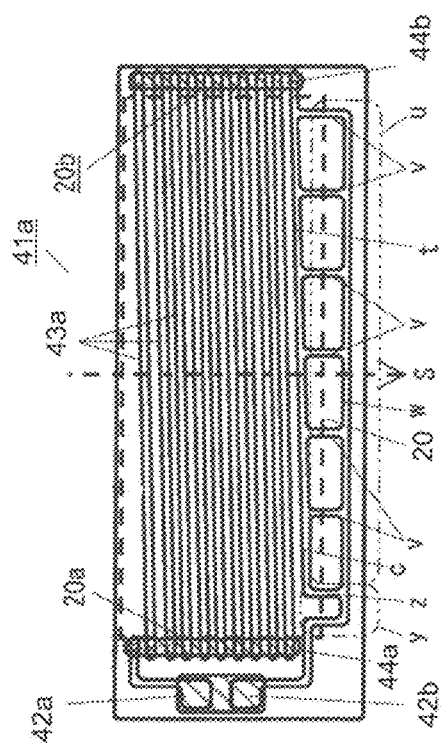
FIGS. 8A and 8B illustrate the wiring of the NFC coil according to the present embodiment.
Figure 8B:
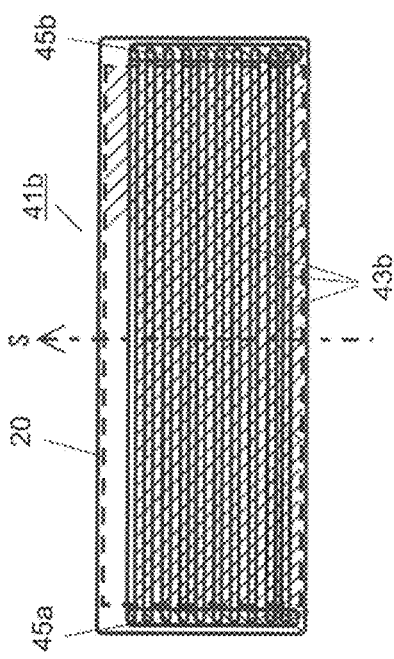

FIGS. 8A and 8B illustrate wiring of the NFC coil in the present embodiment. FIG. 8A shows lower-side flexible substrate 41a as seen from a contact surface with magnetic body 20, and FIG. 8B shows upper-side flexible substrate 41b as seen from a contact surfaces with magnetic body 20. In FIGS. 8A and 8B, the arrow direction of coil axis S is the near side in the perspective views of flexible substrate 41 shown in FIG. 6 and FIG. 7. Further, in addition to divided pattern 43a, lower-side flexible substrate 41a includes external connection terminals 42a and 42b, and in the present embodiment the copper foil of the external connection terminals 42a and 42b are also so-called "exposed" and a solder plating process is executed thereon.

A plurality of divided patterns 43a that serve as a part of NFC coil 40 are formed on lower-side flexible substrate 41a so as to be parallel with each other and to intersect with coil axis S. Further, on upper-side flexible substrate 41b, a plurality of divided patterns 43b that serve as a part of a coil pattern are also formed so as to be parallel with each other and to intersect with coil axis S. The respective two ends of the plurality of divided patterns 43a and 43b are in a state in which copper foil is "exposed" by respective pattern exposing sections 44a and 44b and pattern exposing sections 45a and 45b thereof.

By repeating soldering of the plurality of conductive patterns 43a and 43b that are divided in a manner that sandwiches magnetic body 20 therebetween, a conductive pattern that starts from external connection terminal 42a on lower-side flexible substrate 41a is connected to external connection terminal 42b after going around magnetic body 20. Further, a helical conductive pattern is formed around coil axis S of magnetic body 20. The helical conductive pattern is a so-called "coil" pattern, and is capable of generating lines of magnetic force for performing communication with radio communication media such as IC cards and IC tags.

In this connection, conductive patterns formed on flexible substrate 41 of the present embodiment are not only helical coil patterns. As shown in FIG. 8A, adjustment pattern u that is described in more detail hereunder is provided that is connected to divided pattern t that is positioned on one side of an outermost edge portion. Adjustment pattern u has a plurality of lead-out patterns v in which end parts on one side are connected to divided pattern t. Adjustment pattern u also has connection pattern w that links and is connected with respective end parts on another side that is not connected to divided pattern t of lead-out patterns v, and a protrusion-side end part (end part positioned on the outside of the exterior of magnetic body 20 that is shown by a dotted line) of protrusion section lead-out pattern z constituting part of protrusion section y of divided pattern t.

Note that, in the present embodiment, adjustment pattern u is provided only on the lower-side flexible substrate 41a side. On the other hand, the plurality of divided patterns 43a and 43b forming the coil patterns shown in FIG. 8A and FIG. 8B are provided in a divided manner on both lower-side flexible substrate 41a and upper-side flexible substrate 41b. In addition to adjustment pattern u, external connection terminals 42a and 42b are also provided on lower-side flexible substrate 41a, and lower-side flexible substrate 41a has a larger exterior than upper-side flexible substrate 41b. These parts of adjustment pattern u (that is, all of connection pattern w and part of lead-out patterns v), part of protrusion section y of divided pattern t, and external connection terminals 42a and 42b are arranged at positions that are further to the outer side than the exterior of magnetic body 20 that is shown by a dotted line and upper-side flexible substrate 41b. In other words, it can be said that these parts of adjustment pattern u are arranged at positions that are apart from the outer circumference of magnetic body 20 and upper-side flexible substrate 41b.

Thus, since external connection terminals 42a and 42b are not covered over by magnetic body 20 and upper-side flexible substrate 41b when assembly of NFC coil 40 is completed as shown in FIG. 6, as shown in FIGS. 1A and 1B, NFC coil 40 can be connected to an electronic circuit board that is placed on a surface facing NFC coil 40, and an antenna apparatus can be constructed as a result of such connection.

Further, an adjustment pattern that is not covered by magnetic body 20 and upper-side flexible substrate 41b has at least connection pattern w. The inductance of NFC coil 40 shown in FIG. 6 can be adjusted when assembly of NFC coil 40 is completed by disconnecting either the plurality of lead-out patterns v constituting the adjustment pattern or protrusion section lead-out pattern z constituting part of protrusion section y of divided pattern t by trimming or the like.

The inductance of NFC coil 40 is one factor that determines the resonance frequency of the antenna apparatus that is formed when NFC coil 40 shown in FIGS. 1A and 1B is connected to an electronic circuit board on which an antenna control section such as a matching circuit is mounted. The inductance of NFC coil 40 having the structure of the present embodiment is significantly influenced by variations in the size of magnetic body 20. This is because if the size of magnetic body 20 varies, the apparent magnetic permeability will also vary.

Thus, since there are individual differences in the inductance of NFC coil 40 due to variations in the size of magnetic body 20, variations also arise in the resonance frequency of an antenna apparatus in which NFC coil 40 is mounted. By adjusting the resonance frequency within a predetermined range from a center frequency (for example, 13.56 MHz in the case of RF-ID) defined by communication standards, radio communication can be performed with a high probability and quality. At such time, if variations in the inductance of NFC coil 40 alone are decreased (for example, suppressed to within ±2%), an adjustment range required for adjustment of the resonance frequency of the antenna apparatus in which the relevant NFC coil 40 is mounted can be decreased. Accordingly, the line length of the coil pattern is adjusted in order to suppress variations in the inductance of NFC coil 40 that are attributable to variations in the size of magnetic body 20.

Trimming of the coil pattern for adjusting the inductance of NFC coil 40 is performed at a portion that is further on an outer side than the exterior of magnetic body 20 that is shown by a dotted line among lead-out patterns v and protrusion section lead-out pattern z in FIG. 8A. Since these portions are not covered over by magnetic body 20 and upper-side flexible substrate 41, trimming work can be performed with ease.

For example, a difference between the number of turns of a coil pattern that is wound around magnetic body 20 with respect to a case where only protrusion section lead-out pattern z in FIG. 8A is left and lead-out patterns v are all cut off and a case where only lead-out pattern v adjacent to protrusion section lead-out pattern z is left and the other portions are all cut off is "c."

The inductance of NFC coil 40 varies by an amount that corresponds to that difference.

Note that, in FIG. 8A, protrusion section y that is positioned further on the outer side than the exterior of magnetic body 20 need not necessarily be provided in divided pattern t constituting the coil pattern. However, if protrusion section y is provided, as described above, protrusion section lead-out pattern z that constitutes part of protrusion section y also contributes to adjustment of the inductance of the coil pattern. When divided pattern t that constitutes the coil pattern has protrusion section y that is positioned further on the outer side than the exterior of magnetic body 20, even when NFC coil 40 shown in FIG. 6 is small, it is possible to adequately secure an adjustment margin with respect to the inductance of the coil pattern. Further, since protrusion section y in FIG. 8A is a portion that contributes to adjustment of the inductance of the coil pattern together with adjustment pattern u, protrusion section y must be on the flexible substrate that is on the same side as adjustment pattern u is provided on.

FIG. 9 is a conceptual diagram showing an antenna apparatus formed by an electronic circuit board and an NFC coil that are mounted in a portable terminal according to the present embodiment, and lines of magnetic force generated from the antenna apparatus.

As shown in FIG. 9, the antenna apparatus of the present embodiment includes magnetic body 20 and NFC coil 40, and an electronic circuit board that is placed adjacent to NFC coil 40. As is generally known, a wiring pattern that connects together terminals of each circuit component mounted on the electronic circuit board is provided on a surface of or inside the electronic circuit board. As a result of miniaturization achieved by modern circuit integration, in most cases the electronic circuit board has a plurality of wiring layers. Accordingly, in many cases power supply lines for supplying power to each circuit component and GND (ground) lines are provided as a separate wiring layer from the aforementioned wiring pattern. Naturally, these wiring patterns, power supply lines and GND lines are conductors made of copper or the like. That is, the electronic circuit board (metal body 50) can be regarded as a metal body. When power supply lines and GND lines are provided as a separate wiring layer as mentioned above, since these lines are formed across almost the entire area of the allocated wiring layer, the electronic circuit board becomes a metal body of particularly good quality.

Thus, in the antenna apparatus having NFC coil 40 and the electronic circuit board that can be regarded as practically a metal body, an opening portion of the coil section of NFC coil 40 is perpendicular to the electronic circuit board, and NFC coil 40 is placed at an end part of the electronic circuit board. Note that the term "end part of the electronic circuit board" includes both a case where an end part of NFC coil 40 projects beyond an outermost edge of the electronic circuit board and a case where the end part of NFC coil 40 is positioned further on the inner side than the outermost edge of the electronic circuit board.

It is good for NFC coil 40 to be disposed so that the opening portion of NFC coil 40 is perpendicular to the electronic circuit board and the longitudinal direction of NFC coil 40 is substantially parallel to an endmost part of the electronic circuit board (NFC coil 40 is disposed along the endmost part of the electronic circuit board). Therefore, even when, for example, a wireless type IC card is positioned in not only region P but also in region Q, favorable communication can be performed.

That is, since the opening portion of NFC coil 40 is perpendicular to the electronic circuit board, when a signal is input to NFC coil 40 and a current flows, all of lines of magnetic force M in region Q that are generated from NFC coil 40 are in a direction away from NFC coil 40, and lines of magnetic force M pass in only one direction. As a result, a current flows through, for example, a wireless type IC card positioned in region Q, and the portable terminal in which the antenna apparatus of the present embodiment that includes the electronic circuit board and NFC coil 40 is mounted and the wireless type IC card can conduct communication.

In addition, in region P also, when a signal is input to NFC coil 40 and a current flows, the direction of lines of magnetic force M in region P is either one of a direction away from NFC coil 40 and a direction toward NFC coil 40. This is because lines of magnetic force M generated from NFC coil 40 attenuate in the vicinity of the electronic circuit board, and therefore axis C of lines of magnetic force M is not perpendicular to the electronic circuit board and is inclined relative thereto. As a result, a current flows through, for example, a wireless type IC card positioned in region P, and the portable terminal on which the antenna apparatus of the present embodiment that includes the electronic circuit board and NFC coil 40 is mounted and the wireless type IC card can conduct communication.

Note that, in lines of magnetic force M shown in FIG. 9, axis C exists that connects boundaries of the lines of magnetic force in the direction away from NFC coil 40 and the lines of magnetic force in the direction toward NFC coil 40. When a wireless type IC card, for example, is placed in the vicinity of axis C of lines of magnetic force M, the lines of magnetic force in both the direction away from the antenna and the direction toward the antenna act on the wireless type IC card and cancel each other out. As a result, a current does not flow through the wireless type IC card, and communication is not conducted between the portable terminal in which the antenna apparatus of the present embodiment is mounted and the wireless type IC card.

Next, the reason that axis C of lines of magnetic force M inclines with respect to the electronic circuit board is described. An eddy current that is induced on a surface facing NFC coil 40 of the electronic circuit board by the lines of magnetic force generated by NFC coil 40 produces lines of magnetic force in a perpendicular direction to the surface that faces NFC coil 40 of the electronic circuit board. Therefore, lines of magnetic force M generated by NFC coil 40 and lines of magnetic force generated from the eddy current induced on the surface that faces NFC coil 40 of the electronic circuit board are combined, and lines of magnetic force M generated from NFC coil 40 change in a perpendicular direction in the vicinity of the electronic circuit board. As a result, axis C of lines of magnetic force M inclines to the side that is away from the electronic circuit board.

In addition, since NFC coil 40 is placed at an end part of the electronic circuit board, lines of magnetic force M on the electronic circuit board side (the right side in FIG. 6) of NFC coil 40 attenuate and lines of magnetic force M on the side away from the electronic circuit board (the left side in FIG. 6) of NFC coil 40 are strengthened relatively. As a result, axis C of lines of magnetic force M is inclined with respect to the electronic circuit board. In the configuration of the present embodiment, angle $\alpha$ of axis C of lines of magnetic force M inclines at about 40 to 85 degrees with respect to the electronic circuit board. If NFC coil 40 were not placed at the end part of the electronic circuit board, the lines of magnetic force in a direction perpendicular to the surface of the electronic circuit board generated by an eddy current on the surface of the electronic circuit board would decrease, and axis C of lines of magnetic force M would remain substantially perpendicular to the electronic circuit board. In that case, even if communication can be performed in region Q, communication cannot be conducted in region P.

The end part of NFC coil 40 may be aligned with an end part of the electronic circuit board, or the end part of NFC coil 40 may project beyond the end part of the electronic circuit board. Furthermore, the end part of NFC coil 40 may be placed at a position that is further to the inner side than the end part of the electronic circuit board.

Thus, a current flowing through the electronic circuit board can be utilized to the maximum by positioning NFC coil 40 at an end part of the electronic circuit board. Further, the effect of the present invention is obtained if angle α is approximately 85 degrees, and it is preferable for angle α to be 80 degrees or less.

[Regarding Configuration of Wireless Charging Module]

Next, the configuration of the wireless charging module will be described. FIGS. 10A and 10B are schematic diagrams of lines of magnetic force generated by the charging coil and the NFC coil of the present embodiment.

As shown in FIGS. 10A and 10B, the opening portion of NFC coil 40 according to the present embodiment is perpendicular to metal body 50, and is placed at an end part of metal body 50.

Note that in some cases NFC coil 40 projects beyond an outermost edge of metal body 50 and in some cases NFC coil 40 is located further on the inner side than the outermost edge of metal body 50, and preferably, as described later, a distance between the outer edge of NFC coil 40 and the outermost edge of metal body 50 is approximately −5 mm to +5 mm. Note that, a negative value of "d" indicates that the outer edge of NFC coil 40 is located on the inner side relative to the outermost edge of metal body 50, and in this case indicates that the outer edge of NFC coil 40 is located 2 cm on the inner side relative to the outermost edge of metal body 50. Conversely, a positive value of "d" indicates that the outer edge of NFC coil 40 projects further to the outside than the outermost edge of metal body 50. Note that, the range from −5 mm to +5 mm is due to the width in the short-side direction of magnetic body 20. That is, when the width in the short-side direction of magnetic body 20 is taken as "d", a distance between the outer edge of NFC coil 40 and the outermost edge of metal body 50 is between approximately −d mm and +d mm, which provides the above described NFC communication favorably.

Next, a case where the NFC coil is a sheet antenna is described for comparison.

Even when a charging coil for wireless charging and an NFC sheet antenna for NFC communication are in opposite directions, the opening areas face in the same direction. The reason is that a coil is wound in a planar condition in both the charging coil and the NFC sheet antenna, and furthermore it is necessary to make the respective opening portions thereof large to improve communication efficiency and charging efficiency, and hence the above described configuration is adopted by necessity in an electronic device for which a reduction in size and reduction in thickness are desired. That is, the reason is that since both the wireless charging module and the NFC sheet antenna that are mounted on the casing of an electronic device that has been reduced in size conduct communication (power transmission) utilizing electromagnetic induction, the L values are increased by enlarging the opening area of the charging coil and the NFC sheet antenna.

When the directions of communication (axes of the opening portions) are substantially the same as described above, both the charging coil and the NFC sheet antenna may be liable to be influenced by each other. That is, magnetic flux for power transmission between the wireless charging module of a charger for wireless charging and a charging coil on a charged-side may be taken by the NFC sheet antenna. Further, the NFC sheet antenna may also receive magnetic flux that the charging coil generates when the charging coil receives power. Accordingly, the power transmission efficiency of the NFC sheet antenna may decrease and the charging time period may increase. Further, when performing short-range communication with the NFC sheet antenna also, an eddy current arises in the charging coil in a direction that weakens the magnetic flux generated by the NFC sheet antenna. That is, the thickness of a conducting wire in the charging coil that feeds a large current may be large in comparison to the NFC sheet antenna that conducts communication by feeding a small current. Therefore, from the viewpoint of the NFC sheet antenna, the charging coil may be a large metal object, and as far as the NFC sheet antenna is concerned, the eddy current generated in the charging coil may be of a degree that cannot be ignored. Consequently, the eddy current may adversely affect the efficiency and communication distance of short-range communication conducted by the NFC sheet antenna.

In addition, unless the charging coil and the NFC sheet antenna are stacked completely with the respective centers thereof aligned, two large planar coils are present on a face of the casing, and from the viewpoint of the wireless charging module on the charger side, it may be difficult to determine which coil is the charging coil for the side to be charged. When the alignment accuracy decreases, the power transmission efficiency may decrease by a corresponding amount.

For example, when performing alignment, a method is available in which the wireless charger (primary side) detects the position of the charging coil, and a planar coil of the wireless charger (primary side) is automatically moved to the position of the charging coil. While detection methods which utilize the resonance frequency of the charging coil at such time are available, in such a case there is a possibility that the resonance frequency of the NFC sheet antenna will be detected and the planar coil of the wireless charger will be aligned with the NFC sheet antenna.

Further, a method is available in which a large number of coils are arranged in a line in the wireless charger (primary side) to thereby enable charging of a portable terminal device at every place on the charging surface of the wireless charger (primary side). In this case, the coil (primary side) that is near the NFC sheet antenna may transmit a large amount of unnecessary magnetic flux to the NFC sheet antenna. As a result, there is a risk that wasteful energy consumption or a malfunction will occur.

In addition, in some cases a magnet that is provided on a wireless charger (primary side) performs alignment by attracting a magnetic sheet or a magnet that is provided in a hollow portion of a charging coil. In this case, since there is a possibility that a magnetic sheet that is used for an NFC sheet antenna will be saturated by the magnet and the magnetic permeability will decrease, the L value of the NFC sheet antenna may sometimes decrease. In such a case there is a risk that the communication distance or communication efficiency of the NFC sheet antenna will be reduced.

Therefore, because an opening area of an NFC sheet antenna faces in substantially the same direction as that of a charging coil and generates magnetic flux in substantially the same direction, adverse effects may be exerted on the communication performance of the NFC sheet antenna and the power transmission performance of the charging coil, irrespective of the alignment method.

In contrast, as shown in FIGS. 10A and 10B, when using NFC coil 40 of the present embodiment, since the directions of the opening areas of charging coil 30 and NFC coil 40 and the directions of axes A and B of the windings of the coils can be made to differ from each other, the above described problems do not arise, and it is difficult for the coils to become coupled with each other, and each coil can perform favorable communication (power transmission).

That is, as illustrated in FIG. 10B, coil axis A of charging coil 30 is in the vertical direction in the drawing. In contrast, coil axis B of NFC coil 40 is in the horizontal direction in the drawing. Thus, the coil axes A and B are in a substantially perpendicular relationship with respect to each other. As a result, it is difficult for the coils to become coupled with each other. Note that it is sufficient if the coil axes intersect with each other at an angle within a range of around 80 to 100 degrees.

In addition, when wireless charging module 100 of the present embodiment is used, it is possible for charging coil 30 and NFC coil 40 to perform communication in substantially the same direction. This is because NFC coil 40 behaves in the manner described above using FIG. 9. Note that, in a case where a plurality of NFC coils 40 are provided for that purpose, it is good to wind NFC coils 40 so that the magnetic flux of all NFC coils 40 extend in the same direction (for example, the upward direction in FIG. 10B). That is, the two NFC coils 40 in FIG. 10A are each wound in the clockwise direction as seen from the outside.

Note that since it is preferable for NFC coil 40 to be placed at a position that is further on the edge side than the center portion side of metal body 50, it is good to arrange NFC coil 40 on the outer side of charging coil 30. As illustrated in FIGS. 10A and 10B, while it is not necessarily the case that NFC coil 40 must be placed at two places around charging coil 30, because axis C of the magnetic flux is caused to incline by metal body 50, it is preferable to arrange NFC coil 40 on both sides. Further, in FIGS. 10A and 10B, the two NFC coils 40 are connected in a loop shape so as to surround the circumference of charging coil 30.

For example, if charging coil 30 is wound in a substantially oblong shape, and NFC coil 40 is placed along a long side thereof, wireless charging module 100 can be reduced in size. Further, if the width in the longitudinal direction of NFC coil 40 is substantially the same as the width in the same direction of charging coil 30, wireless charging module 100 can be reduced in size. In addition, in order to allow axis C of magnetic flux of NFC coil 40 to incline sufficiently, it is preferable not to arrange magnetic sheet 10 underneath NFC coil 40.

Next, communication characteristics of the NFC coil in the wireless charging module of the present embodiment are described using FIGS. 11A and 11B to FIGS. 14A and 14B.

Figure 11B:
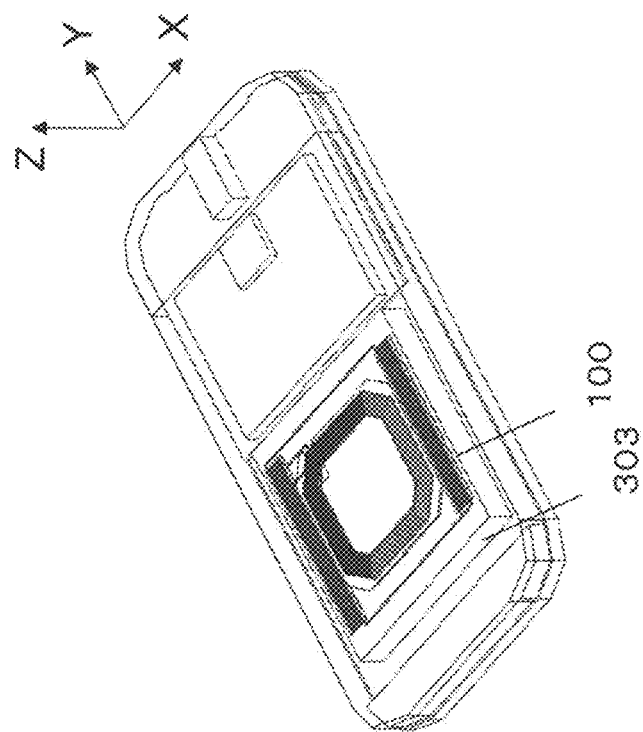
FIGS. 11A and 11B are perspective views illustrating a portable terminal equipped with the wireless charging module according to the present embodiment, and a portable terminal equipped with a wireless charging module that includes a loop-shaped NFC antenna for comparison.
Figure 11A:
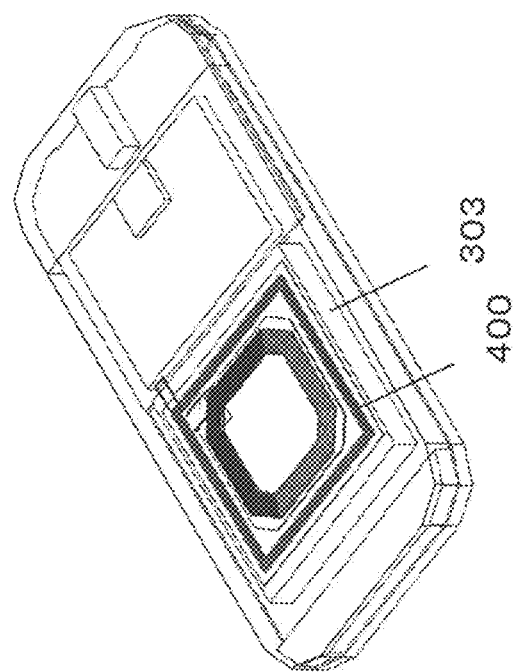
Figure 12:
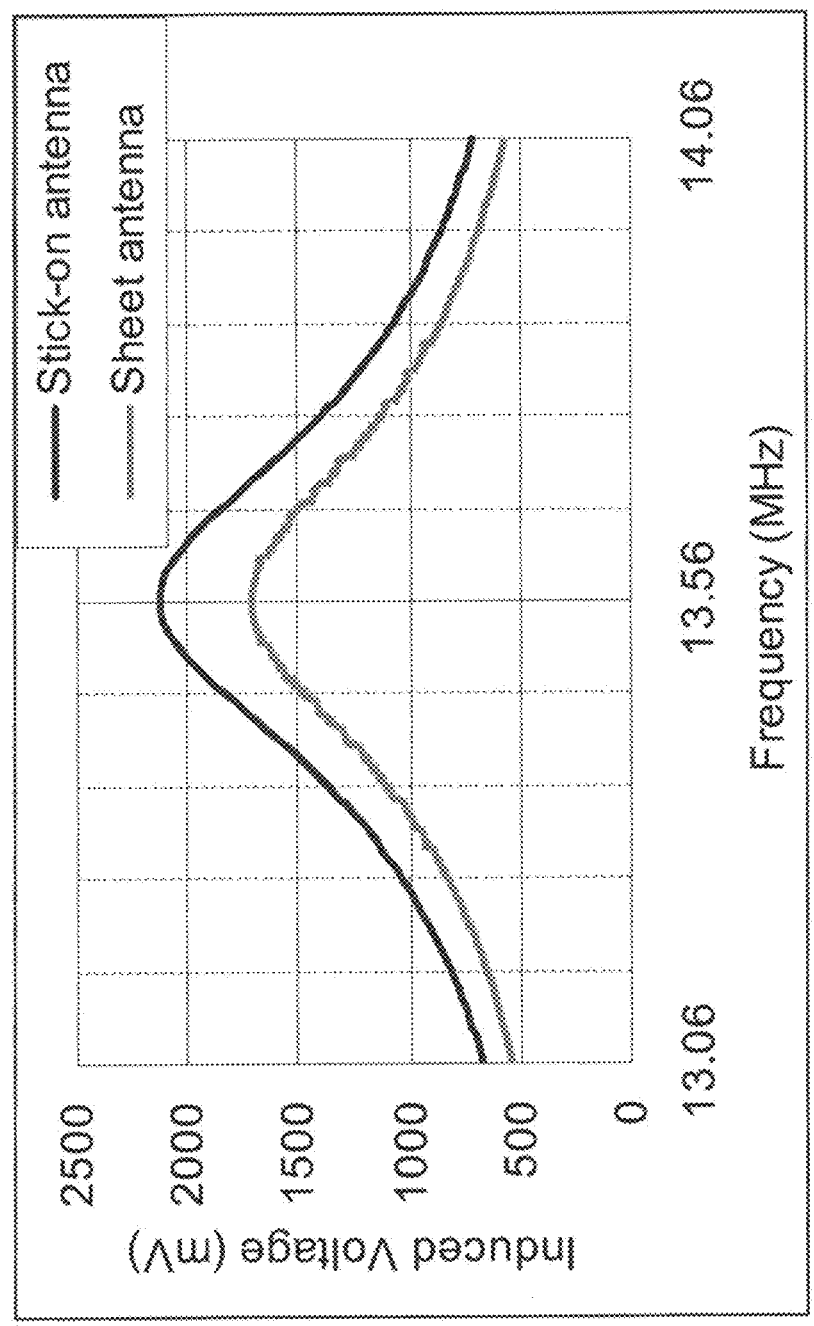
FIG. 12 illustrates a frequency characteristic of an induced voltage for each of the two wireless charging modules illustrated in FIGS. 11A and 11B.
Figure 13B:
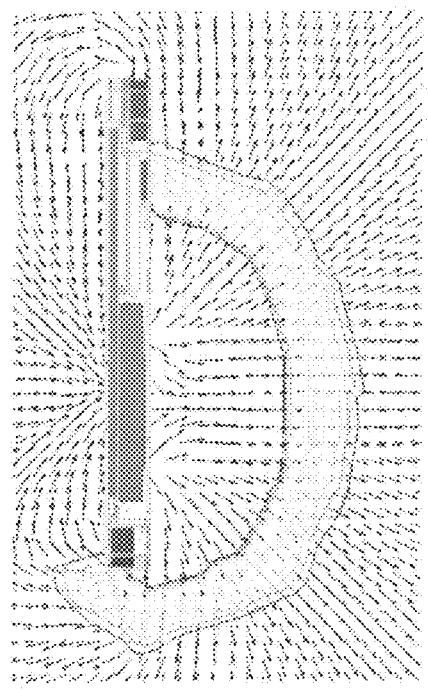
FIGS. 13A and 13B each illustrate a magnetic field on a YZ plane of a corresponding one of the two wireless charging modules illustrated in FIGS. 11A and 11B.
Figure 13A:
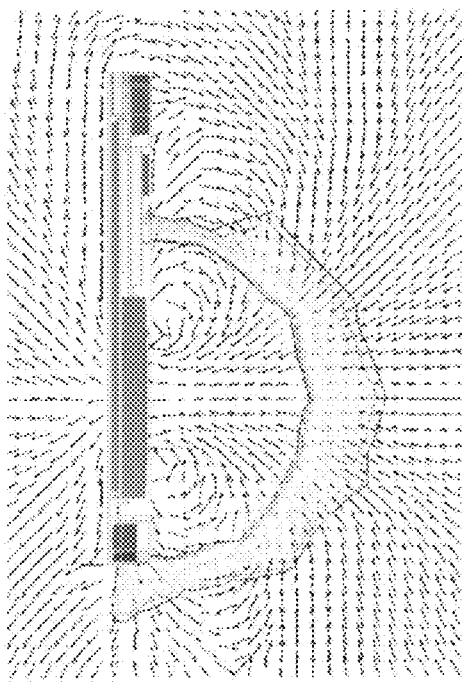

FIGS. 11A and 11B are perspective views illustrating a portable terminal including the wireless charging module of the present embodiment and, for comparison, a portable terminal including a wireless charging module including a loop-shaped NFC coil. FIG. 12 illustrates the respective frequency characteristics of induced voltages of the two wireless charging modules shown in FIGS. 11A and 11B. FIGS. 13A and 13B each illustrate a magnetic field on a YZ plane of a corresponding one of the two wireless charging modules illustrated in FIGS. 11A and 11B. FIGS. 14A and 14B each illustrate a magnetic field on a ZX plane of a corresponding one of the two wireless charging modules illustrated in FIGS. 11A and 11B. Note that, for comparison, FIG. 11A, FIG. 13A and FIG. 14A illustrate the case of a wireless charging module that includes a loop-shaped NFC antenna, while FIG. 11B, FIG. 13B and FIG. 14B illustrate the case of the wireless charging module of the present embodiment.

In FIG. 11A and FIG. 11B, wireless charging module 100 of the present embodiment and wireless charging module 400 including a loop-shaped NFC antenna are mounted so as to be stacked on battery pack 303. The power transmission direction of charging coil 30 and the communication direction of NFC coil 40 of wireless charging modules 100 and 400, respectively, are the direction of the rear surface of the portable terminal (a side on which a display section such as a liquid crystal display is disposed is assumed to be the front surface).

At such time, as shown in FIG. 12, an induced electromotive force of NFC coil 40 of wireless charging module 100 is larger than an induced electromotive force of the loop-shaped NFC coil of wireless charging module 400. Consequently, the communication efficiency of NFC coil 40 of wireless charging module 100 is higher than that of loop-shaped NFC coil of wireless charging module 400. Further, as is apparent from FIGS. 13A and 13B and FIGS. 14A and 14B, a region in which communication can be performed is wider in the case of NFC coil 40 of wireless charging module 100 than in the case of the loop-shaped NFC coil of wireless charging module 400.

At such time, the area of wireless charging module 400 shown in FIG. 11A and the area of the wireless charging module shown in FIG. 11B are substantially the same size (40 mm×40 mm×0.4 mm).

Note that, when the same magnetic sheet 10 and charging coil 30 are used in wireless charging module 100 and wireless charging module 400, the power transmission efficiency of charging coil 30 does not change significantly. The reason is that charging coil 30 is sufficiently large in comparison to the antenna for NFC communication.

Charging coil 30 is a component for transmitting power during wireless charging, and transmits stepped power over an extended time period. In contrast, communication by NFC coil 40 is performed for a short time period and the amount of power at the time of communication is also small in comparison to charging coil 30. Consequently, a conducting wire constituting charging coil 30 is thicker than a conducting wire constituting NFC coil 40, and the number of turns thereof is also more than the conducting wire constituting NFC coil 40. Consequently, from the viewpoint of NFC coil 40, charging coil 30 is a large metal body, and charging coil 30 exerts a large influence on NFC coil 40. In contrast, from the viewpoint of charging coil 30, NFC coil 40 is small, and NFC coil 40 has little influence on charging coil 30.

Therefore, when the same magnetic sheet 10 and charging coil 30 are used in wireless charging module 100 and wireless charging module 400, respectively, the power transmission efficiency of charging coil 30 does not change significantly, irrespective of the shape of the coil (antenna) for NFC communication.

As described above, by adopting a configuration in which axis A of charging coil 30 and axis B of NFC coil 40 intersect with each other, charging coil 30 and the NFC coil can be prevented from interfering with each other. In particular, mutual interference can be prevented the most by adopting a configuration in which axis A of charging coil 30 and axis B of NFC coil 40 are substantially orthogonal to each other.

By adopting a configuration in which charging coil 30 is wound in a rectangular shape and at least two NFC coils 40 are placed along two facing sides of rectangular charging coil 30, a region in which NFC communication is possible can be extended in a well-balanced manner around wireless charging module 100. In particular, when mounted in a portable terminal, even if the center of charging coil 30 is placed at the center side of the portable terminal, the overall center of the plurality of NFC coils 40 can also be located at the center side of the portable terminal. Consequently, it is possible to prevent a situation from arising in which a region in which charging is possible and a region in which NFC communication is possible around the portable terminal are significantly biased toward a particular direction.

Further, arranging NFC coil 40 on the outer side of magnetic sheet 10 makes it possible to efficiently perform the communication of NFC coil 40. Furthermore, by adopting a configuration in which magnetic sheet 10 and magnetic body 20 are constituted by respectively different kinds of ferrite, wireless charging and NFC communication can each be performed efficiently.

[Regarding Portable Terminal]

FIGS. 15A to 15E are sectional views that schematically illustrate a portable terminal including the wireless charging module of the present embodiment. In FIGS. 15A to 15E, the portable terminal includes a display section on an upper face side, and a lower face side thereof serves as a communication face. In portable terminal 300 illustrated in FIGS. 15A to 15E, components other than casing 301, substrate 302, battery pack 303, and wireless charging module 100 are not shown, and FIGS. 15A to 15E schematically illustrate arrangement relationships between casing 301, substrate 302, battery pack 303, and wireless charging module 100.

Portable terminal 300 includes, within casing 301, substrate 302 that performs control of at least a part of portable terminal 300, battery pack (power holding section) 303 that temporarily stores received power, and wireless charging module 100 that is described above. The display section may sometimes include a touch panel function. In such a case, a user operates the portable terminal by performing a touch operation on the display section. With respect to the orientation of wireless charging module 100, naturally magnetic sheet 10 is disposed on the display section side (upper side in FIGS. 15A to 15E), and charging coil 30 and NFC coil 40 are disposed so as to face the rear surface side of casing 301 (lower side in FIGS. 15A to 15E). It is thereby possible to make the transmitting direction for wireless charging and also the communication direction of the NFC coil the direction of the rear surface side of casing 301 (lower side in FIGS. 15A to 15E).

In FIG. 15A, among substrate 302, battery pack 303, and wireless charging module 100, substrate 302 is disposed furthest on the display section side (upper side in FIGS. 15A to 15E), battery pack 303 is disposed on the rear side of substrate 302, and wireless charging module 100 is nearest to the rear surface side of casing 301. At least a part of substrate 302 and a part of battery pack 303 are stacked, and at least a part of battery pack 303 and wireless charging module 100 are stacked. It is thereby possible to prevent wireless charging module 100 and substrate 302 as well as electronic components mounted on substrate 302 from exerting adverse effects (for example, interference) on each other. Further, since battery pack 303 and wireless charging module 100 are disposed adjacent to each other, the components can be connected easily. In addition, an area for substrate 302, battery pack 303, and wireless charging module 100, in particular, can be adequately secured, and there is a high degree of design freedom. The L values of charging coil 30 and NFC coil 40 can be adequately secured.

In FIG. 15B, among substrate 302, battery pack 303, and wireless charging module 100, substrate 302 is disposed furthest on the display section side (upper side in FIGS. 15A to 15E), and battery pack 303 and wireless charging module 100 are disposed in parallel on the rear side of substrate 302. That is, battery pack 303 and wireless charging module 100 are not stacked, and are disposed in parallel in the transverse direction in FIGS. 15A to 15E. At least a part of substrate 302 and battery pack 303 are stacked, and at least a part of substrate 302 and wireless charging module 100 are stacked. Thus, since battery pack 303 and wireless charging module 100 are not stacked, casing 301 can be made thinner. In addition, an area for substrate 302, battery pack 303, and wireless charging module 100, in particular, can be adequately secured, and there is a high degree of design freedom. The L values of charging coil 30 and NFC coil 40 can be adequately secured.

In FIG. 15C, among substrate 302, battery pack 303, and wireless charging module 100, substrate 302 and battery pack 303 are disposed furthest on the display section side (upper side in FIGS. 15A to 15E), and wireless charging module 100 is disposed on the rear side of battery pack 303. That is, battery pack 303 and substrate 302 are not stacked, and are disposed in parallel in the transverse direction in FIGS. 15A to 15E. At least a part of battery pack 303 and a part of wireless charging module 100 are stacked. Thus, since battery pack 303 and substrate 302 are not stacked, casing 301 can be made thinner. Further, since battery pack 303 and wireless charging module 100 are stacked and thus battery pack 303 and wireless charging module 100 are disposed adjacent to each other, these components can be connected easily. In addition, an area for substrate 302, battery pack 303, and wireless charging module 100 can be adequately secured, and the L values of charging coil 30 and NFC coil 40 can be adequately secured.

In FIG. 15D, among substrate 302, battery pack 303, and wireless charging module 100, substrate 302 and battery pack 303 are disposed furthest on the display section side (upper side in FIGS. 15A to 15E), and wireless charging module 100 is disposed on the rear side of substrate 302. That is, battery pack 303 and substrate 302 are not stacked, and are disposed in parallel in the transverse direction in FIGS. 15A to 15E. At least a part of substrate 302 and a part of wireless charging module 100 are stacked. Thus, since battery pack 303 and substrate 302 are not stacked, casing 301 can be made thinner. In general, battery pack 303 is the thickest among substrate 302, battery pack 303, and wireless charging module 100. Therefore, rather than stacking the battery pack and another component, casing 301 can be made thin by stacking substrate 302 and wireless charging module 100. Further, an area for substrate 302, battery pack 303, and wireless charging module 100 can be adequately secured, and the L values of charging coil 30 and NFC coil 40 can be adequately secured.

In FIG. 15E, substrate 302, battery pack 303, and wireless charging module 100 are disposed on the display section side (upper side in FIGS. 15A to 15E). That is, substrate 302, battery pack 303, and wireless charging module 100 are not stacked with respect to each other at all, and are disposed in parallel in the transverse direction in FIGS. 15A to 15E. Thus casing 301 can be made with the smallest thickness among the configurations illustrated in FIGS. 15A to 15E.

The disclosure of the specification, drawings, and abstract included in Japanese Patent Application No. 2012-032317 filed on Feb. 17, 2012 is incorporated herein by reference in its entirety.

INDUSTRIAL APPLICABILITY

The present invention is useful for various kinds of electronic devices such as a portable terminal including the wireless charging module that includes a wireless charging module and an NFC antenna, in particular, portable devices such as a mobile phone, a portable audio device, a personal computer, a digital camera, and a video camera.

REFERENCE SIGNS LIST

100 Wireless charging module
10 Magnetic sheet
11 Slit
12 Flat portion
13 Center portion
20 Magnetic body
30 Charging coil
31a, 31b, 31c, 31d Corner portion
32a, 32b Leg portion
33 Inner portion
40 NFC coil
50 Metal body
200 Primary-side wireless charging module
210 Primary-side coil
220 Magnet
300 Portable terminal
301 Casing
302 Substrate
303 Battery pack

The invention claimed is:

1. A chargeable communication module comprising:
a wireless power charging coil;
first and second wireless communication coils, which are respectively electrically isolated from the wireless power charging coil; and
a magnetic sheet;
wherein the wireless power charging coil is disposed on a surface of the magnetic sheet, and
the first and second wireless communication coils are adjacent to and outside of the wireless power charging coil, at least a portion of the first wireless communication coil is disposed on the surface of the magnetic sheet, and at least a portion of the second wireless communication coil is disposed on the surface of the magnetic sheet.

2. The chargeable communication module according to claim 1, wherein the first wireless communication coil is configured to perform communication by electromagnetic induction.

3. The chargeable communication module according to claim 1, wherein the wireless power charging coil has a first resonant frequency and the first wireless communication coil has a second resonant frequency different from the first resonant frequency.

4. The chargeable communication module according to claim 3, wherein the first resonant frequency of the wireless power charging coil is lower than the second resonant frequency of the first wireless communication coil.

5. The chargeable communication module according to claim 1, wherein a power transfer frequency of the wireless power charging coil is different from a communication frequency of the second wireless communication coil.

6. The chargeable communication module according to claim 1, wherein the wireless power charging coil and the first and second wireless communication coils are conductive wiring patterns formed on a substrate.

7. The chargeable communication module according to claim 1, wherein a number of turns of the wireless power charging coil is greater than a number of turns of the first wireless communication coil.

8. The chargeable communication module according to claim 7, wherein the number of turns of the wireless power charging coil is greater than a number of turns of the second wireless communication coil.

9. The chargeable communication module according to claim 1, wherein the wireless power charging coil is formed in an oval shape or a circular shape.

10. The chargeable communication module according to claim 1, wherein the wireless power charging coil is formed to define an internal hollow portion surrounded by the wireless power charging coil.

11. The chargeable communication module according to claim 10, wherein the internal hollow portion has an oval shape or a circular shape.

12. The chargeable communication module according to claim 10, wherein the largest linear dimension of the internal hollow portion is greater than 15.5 mm.

13. The chargeable communication module according to claim 10, wherein the magnetic sheet has a raised portion that faces the internal follow portion of the wireless power charging coil.

14. A mobile terminal comprising:
a chargeable communication module including a wireless power charging coil; first and second wireless communication coils, which are respectively electrically isolated from the wireless power charging coil; and a magnetic sheet; wherein the wireless power charging coil is disposed on a surface of the magnetic sheet, and the first and second wireless communication coils are adjacent to and outside of the wireless power charging coil, at least a portion of the first wireless communication coil is disposed on the surface of the magnetic sheet, and at least a portion of the second wireless communication coil is disposed on the surface of the magnetic sheet, the chargeable communication module having a substantially planar shape;
a battery pack having a substantially planar shape and configured to store power from the chargeable communication module; and
a circuit board substrate configured to control operation of the mobile terminal.

15. The mobile terminal according to claim 14, wherein the wireless charging module overlaps with the battery pack.

16. The mobile terminal according to claim 15, wherein the magnetic sheet overlaps with the battery pack.

17. The mobile terminal according to claim 14, wherein the first wireless communication coil is configured to perform communication by electromagnetic induction.

18. The mobile terminal according to claim 14, wherein the wireless power charging coil has a first resonant frequency and the first wireless communication coil has a second resonant frequency different from the first resonant frequency.

19. The mobile terminal according to claim 14, wherein a power transfer frequency of the wireless power charging coil is different from a communication frequency of the second wireless communication coil.

20. The mobile terminal according to claim 14, wherein the wireless power charging coil and the first and second wireless communication coils are conductive wiring patterns formed on a substrate.

* * * * *